United States Patent [19]
Newell et al.

[11] Patent Number: 5,123,087
[45] Date of Patent: Jun. 16, 1992

[54] GEOMETRIC INFERENCE ENGINE

[75] Inventors: Martin E. Newell, Palo Alto; Daniel T. Fitzpatrick, Woodside, both of Calif.

[73] Assignee: Ashlar, Inc., Sunnyvale, Calif.

[21] Appl. No.: 516,004

[22] Filed: Apr. 27, 1990

[51] Int. Cl.[5] .......................................... G06F 15/606
[52] U.S. Cl. .................................... 395/155; 395/133
[58] Field of Search ............... 364/518, 521, 522, 523; 340/721, 723, 747; 382/27, 49; 395/133, 155, 161

[56] References Cited

U.S. PATENT DOCUMENTS

| | | | |
|---|---|---|---|
| 4,663,616 | 5/1987 | Himelstein | 349/724 |
| 4,809,346 | 2/1989 | Shu | 382/49 |
| 4,809,347 | 2/1989 | Nash et al. | 382/49 |
| 4,813,013 | 3/1989 | Dunn | 340/747 |
| 4,852,055 | 7/1989 | Lapeyre | 364/512 |

OTHER PUBLICATIONS

Sutherland, I., Sketchpad: "A Man-Machine Graphical Communication System," Proceedings—Joint Computer Conference, 1963.
Bier, E., "Snap-Dragging." Siggraph '86 Proceedings, vol. 20, No. 4, Aug. 18-22, 1986.

*Primary Examiner*—Heather R. Herndon
*Attorney, Agent, or Firm*—Townsend and Townsend

[57] ABSTRACT

A computer-aided drafting system and methods for automatically locating geometric points for a user. A method includes defining a type of geometric point which includes a point type of interest to the user, setting a hit radius, displaying an object, displaying a curser to indicate a location, testing the object to find a point having the defined point type, which is within the hit radius of the curser, and if a point is found then displaying the point. A computer-aided drafting system includes a computer having a memory and a processor, a display device, a cursor control device, and instructions for directing the processor to automatically locate geometric points of interest to the user.

29 Claims, 38 Drawing Sheets

GEOMETRIC INFERENCE ENGINE

BACKGROUND OF THE INVENTION

The present invention relates generally to drawing programs and computer-aided drafting (CAD) systems and, more particularly, to precise cursor positioning and screen feedback techniques for creating and manipulating graphic objects.

Computers have become a powerful tool for the rapid and economical creation of pictures. The use of computer graphics is particularly well suited for automating designing and drafting techniques. CAD is like a word processor for drawings. Instead of pen and paper, the CAD user employs a computer keyboard and a mouse, light pen, digitizer tablet, or some other pointing device to create an electronic description of a drawing in the computer's memory. This image is displayed on a monitor and stored on a disk. When the user is satisfied with a drawing, he or she obtains a "hardcopy" by sending the stored image to an output device such as a plotter.

In CAD, one creates an illustration by combining basic geometric objects such as points, lines, and arcs. Each object has a precise mathematical definition facilitating storage in the computer. This also allows the computer to perform complex manipulations and test relations between objects. For example, when an object's dimensions are specified to the computer, the user can view any side of the object to see how it will look after construction.

In drafting, it is often necessary to maintain precise geometric relationships between various objects in a drawing. The draftsman's hand can rarely, if ever, achieve the mathematical precision that is available with CAD systems. However, to take advantage of this precision, the user must accurately communicate to the computer what is to be drawn.

Ordinarily, the user draws by entering, either by keyboard or pointing device, the location of an object's "control points." For example, if the user wants to draw a line (line segment), he or she types in or points to the starting and ending points. The computer then displays a line defined by these control points. Alternatively, the computer can infer control points from what the user enters. For example, the user may enter a starting point, length, and angle. From this input, the computer calculates the second control point before displaying the line.

Neither input method is perfect. While keyboard entry allows for the precise input of most geometric objects, it is usually not the most efficient means by which the user may communicate with a computer. For example, it would be a tedious task, at best, to draw the entire floor plan of a simple house by keyboard entry. Entering locations with a pointing device, while much faster, relies too much upon the skill of the user for accuracy. As a result, there is much interest in developing techniques by which CAD users may efficiently communicate with computers without sacrificing precision.

Sutherland describes a positioning technique based upon the use of a light pen (Sutherland, Sketchpad: A Man-Machine Graphic Communication System, Proceedings-Spring Joint Computer Conference, 1963). The Sutherland Sketchpad system allows a user to communicate rapidly with a computer through the medium of line drawing.

Recognizing that typed statements were a cumbersome way to describe the shapes of complex objects, the Sketchpad system uses a light pen for the placement of a drawing cursor. To compensate for the inaccuracy created by freehand pointing, the exact location of the light pen is ignored in favor of a "pseudo-pen" location which is exactly on an object aimed at. In other words, object, the computer assumes that the user wants to point to that object. If no object is aimed at, the pseudo-pen location and actual pen location are identical. Thus, the Sketchpad system compensates for a user's imprecise cursor placement by constraining or snapping control points onto an existing object.

Bier discloses the use of "gravity active" points and "alignment objects." See, Bier, Snap Dragging, SIGGRAPH '86 Proceedings, Volume 20, No. 4, Aug. 18-22, 1986, 233-240. Bier's system uses a "caret" as the source of precision. The caret is distinct from the cursor: the cursor always moves with the mouse while the caret can stray from the cursor and "snap" to a gravity object which attracts it. When a control point is added to an illustration, it is always positioned at the location of the caret.

While these systems offer certain advantages over prior input techniques, they are confined to snapping cursors onto existing objects and/or grids. These systems completely ignore other "interesting" points which arise from user-created geometries. Thus, the user must manually determine these points—a task which is better automated by the computer. Moreover, prior systems fail to provide the user with adequate feedback about even the simplest interactions between the cursor and geometries. The invention recognizes these shortcomings and provides novel methods and apparatus which fulfills these and other needs.

SUMMARY OF THE INVENTION

This invention provides a computer-aided drafting system which includes precise cursor positioning and screen feedback techniques for creating and manipulating graphic objects. The techniques include: (1) the automatic recognition of interesting points; (2) the use of screen messages; (3) the addition of a secondary cursor; (4) the creation of temporary geometry; (5) the examination for interesting points which arise from actual geometry, temporary geometry, and/or the interaction of actual and temporary geometry; and (6) precise transformations accomplished with the assistance of interesting points.

BRIEF DESCRIPTION OF THE DRAWINGS

FIG. 20O is a flow diagram for the snap-onto-lines case arm in the ptSnap function.

DESCRIPTION OF THE PREFERRED EMBODIMENTS

Introduction

Figure 1:
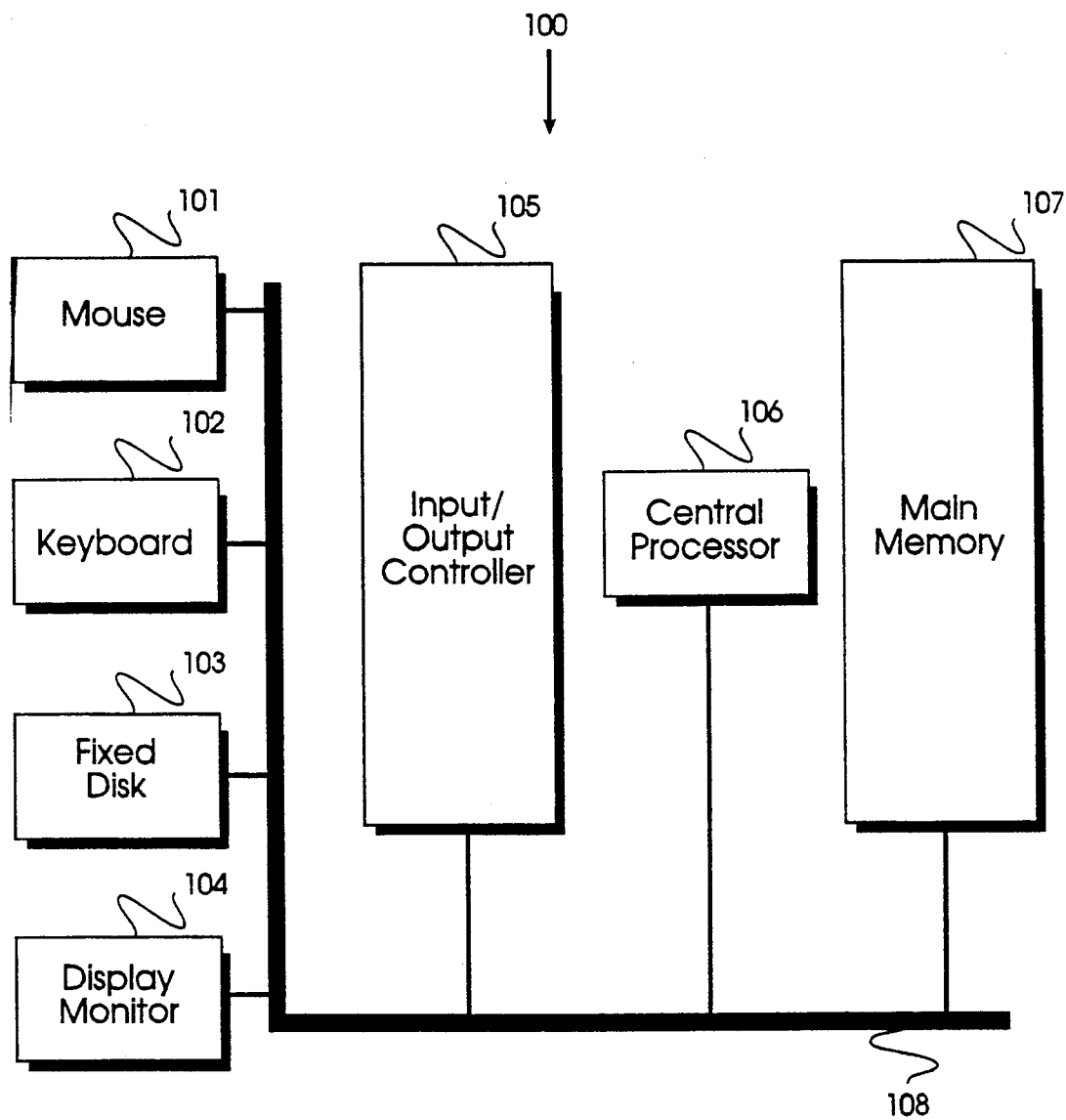
FIG. 1 is a simplified functional block diagram of a computer system in which the present invention may be embodied.

The invention may be embodied on a computer system such as the system 100 of FIG. 1, which comprises a mouse 101, a keyboard 102, a fixed disk 103, a display monitor 104, an input/output controller 105, a central processor 106, and a main memory 107. The various components communicate through a system bus 108 or similar architecture. The user enters commands through the keyboard 102 and/or the mouse 101; the computer displays the image through the display monitor 104, such as a cathode ray tube or a printer. In the preferred embodiment, an appropriately programmed Macintosh personal computer (Apple Computers, Cupertino, Calif.) is used.

In this interactive CAD system, the user constructs objects on the display monitor 104 with the mouse 101. The system emulates the drawing tools which are typically available to the draftsman, such as a compass, a ruler, a technical pen, a french curve, and a transfer screen. Each drawing is constructed from geometric objects which have precise mathematical definitions and, thus, are represented in the computer's memory 107. To draw a line, for example, one need only specify its starting and ending points. Likewise, a circle is constructed by specifying its center and a point on the circle. The accurate placement of these "control points" is crucial for the creation of geometric objects in CAD systems.

The ability to illustrate objects by the placing of control points allows the user to create illustrations with the mathematical precision of a computer. Prior systems, however, concentrate on constraining control points to lie on either a prior-drawn object or on some type of grid. These systems ignore the geometrically "interesting points" that the user may wish to interact with.

The present invention recognizes that there are many types of interesting points which one needs for efficient designing and drafting and, therefore, provides a geometric inference engine which automatically locates these points. Interesting points are any geometric entity, parameter, or location which is of interest to the draftsman; types include midpoints, endpoints, intersections, vertices, tangents, perpendiculars, arc centers, and arc quadrant points. In addition to locating these points automatically, the system also indicates the exact nature of each and how it is found.

As the user moves the mouse, the system locates nearby interesting point by examining all geometries close to the cursor. If there is a best interesting point nearby, the system displays it to the user by drawing an "X" (secondary cursor) over it with a message of how the point was found.

Figure 2A:
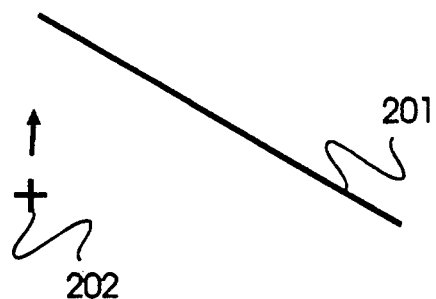
FIGS. 2A-B illustrate a simple example of locating an interesting point, the endpoint for a line.
Figure 2B:
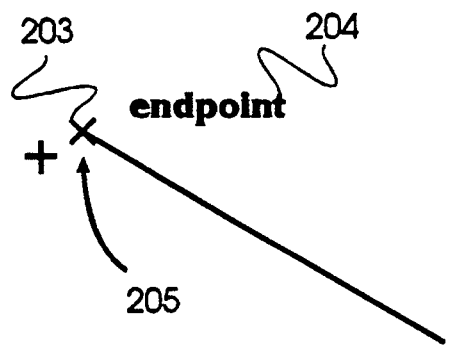

FIGS. 2A-B illustrate a simple case of locating an interesting point. In FIG. 2A, the cursor 202 is not near any interesting points. However, once the cursor 202 moves sufficiently close to the end of the line 201, an interesting point is identified. As seen in FIG. 2B, the secondary cursor 203 snaps to the line's endpoint 205 and the message "endpoint" 204 is displayed. The system performs this detection automatically, i.e., without any additional user action.

Prior systems provide minimal, if any, support for interesting points. For example, to interact with even the simplest type of interesting point, such as a midpoint, the user must enter a series of commands. Typically, the user must first select an object or group of objects. Then he or she must specify the type of the interesting point. Only after completing these steps, may the user interact with the point sought. Screen feedback is minimal. Moreover, the set of interesting points available in these systems is very limited—the user may select only those points which are intrinsic to the object or objects drawn.

In the present invention, the locating of nearby interesting points is merely the initial inquiry of the geometric inference engine. If the system does not find an interesting point, it generates more geometry to see if this creates new interesting points. An example best demonstrates this feature.

Figure 3A:
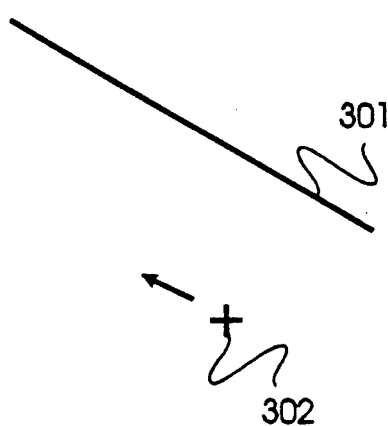
FIGS. 3A-B illustrate the creation of new interesting points from the construction of temporary geometry.
Figure 3B:
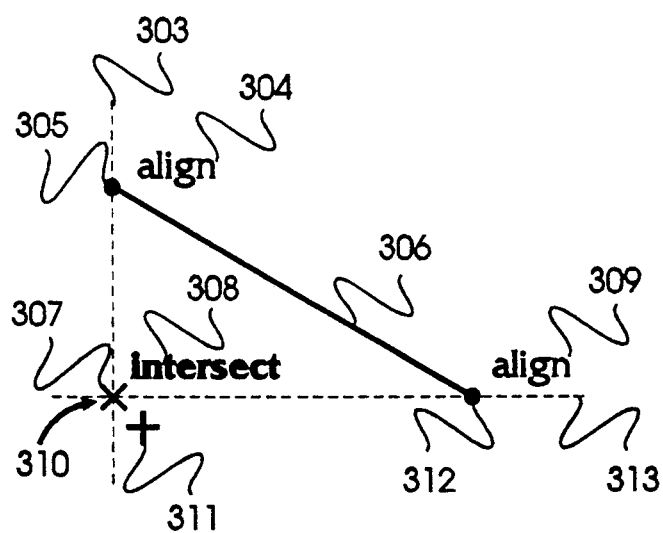

FIGS. 3A-B illustrate the construction of temporary geometry by the system to create new interesting points. In FIG. 3A, as the cursor 302 moves no interesting points are encountered. Specifically, cursor 302 is not near any interesting points, such as endpoints or midpoint, which lie on the line 301.

In FIG. 3B, the system generates additional geometry by creating temporary construction lines 303, 313. These lines 303, 313 are termed "temporary geometry" to distinguish them from existing objects or actual geometry (e.g., line 306). The intersection 310 of these lines 303, 313 is near the location of the cursor 311.

The system recognizes this intersection 310 of temporary geometry as an interesting point. It indicates this to the user by snapping the secondary cursor 307 onto the intersection 310 and displaying the "intersect" message 308. As FIG. 3B indicates, this interesting point 310 is aligned vertically and horizontally with the endpoints 305, 312 of the existing line 306. Furthermore, the reason for the generation of the temporary construction lines is indicated by displaying "align" messages 304, 309 proximal to the endpoints 305, 312 which caused their creation.

These simple examples provide an introduction to interesting points and serve as a foundation upon which more complex geometries may be illustrated. It is apparent that interesting points are inherent to a geometric object, such as an endpoint, midpoint, or center, or they arise from the generation of temporary geometry. In the latter case, the system constructs temporary geometric objects which themselves are examined for interesting points. The system uses two basic objects—lines and circles13 to construct temporary geometry. Each of these will now be examined in greater detail.

Figure 4A:
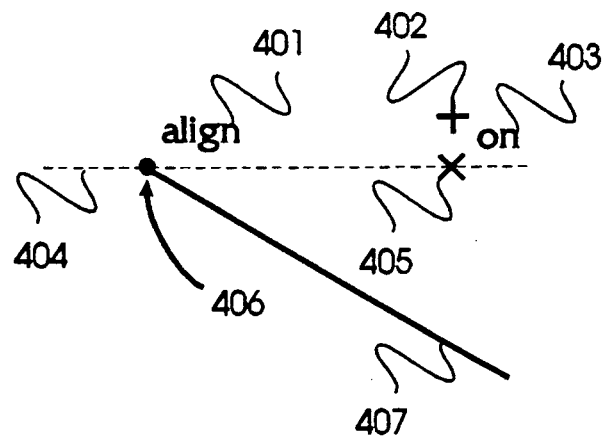
FIGS. 4A-B illustrate the use of temporary construction lines to maintain precise angular relations for normal creation angles.
Figure 4B:
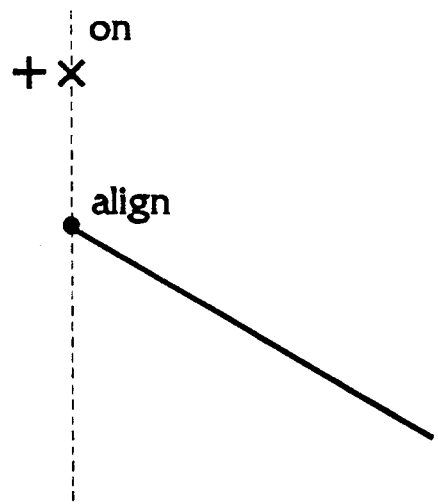

The creation of temporary construction lines allows for several geometric relationships to be tested. As seen in FIGS. 4A-B, one use for temporary construction lines is to maintain precise angular relations. FIG. 4A illustrates the construction of a temporary construction line 404 at 0° relative to the endpoint 406 (interesting point) of an existing line 407. The "align" message 401 indicates to the user the reason for the creation of the temporary construction line 404. The "on" message 403 indicates that the secondary cursor 405 now lies on the temporary construction line 404. FIG. 4B illustrates the creation and display of a temporary construction line for 90°.

The present invention provides a further refinement for the creation of temporary construction lines. The user may have many different alignment angles that he or she wishes to use; however, it is cumbersome, if not confusing, to display numerous alignment angles for a given point. The system solves this problem by providing two groups of alignment angles: 1) Normal creation angles and 2) Additional creation angles. The first group comprises the set of alignment angles which the user wants displayed automatically whenever the cursor traverses their path. The second group comprises the angles which are displayed automatically only under special circumstances. In the preferred embodiment, the user specifies a set of normal and additional creation angles or accepts the system's default values.

Figure 5A:
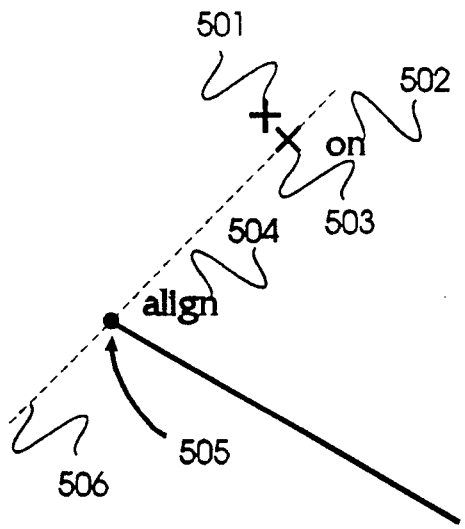
FIGS. 5A-B illustrate the use of temporary construction lines to maintain precise angular relations for additional creation angles.
Figure 5B:
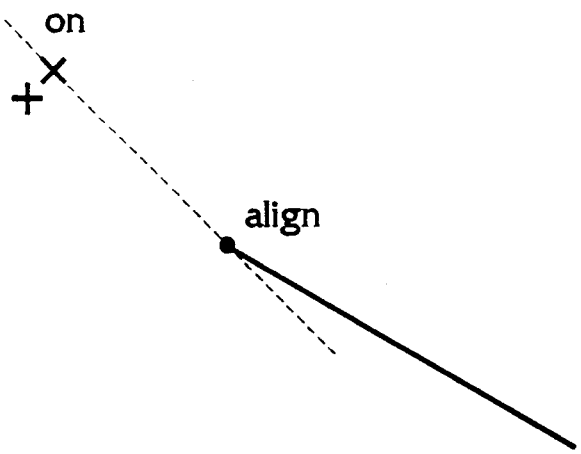

FIGS. 5A-B illustrate the operation of additional creation angles. In FIG. 5A, the endpoint 505 is the current point, i.e., the last point that the user entered. As the cursor 501 moves, the geometric inference engine checks alignment of the cursor 501 with the current point 505 to see if it is near an additional creation angle.

In FIG. 5A, an additional creation angle of 45° is set. As the cursor 501 approaches a 45° angle relative to a horizontal line passing through the current point 505, the temporary construction line 506 is displayed along with the "align" message 504. The secondary cursor 503 moves onto the line 506 accompanied by the "on" message 502. Without this technique, the potential plethora of temporary construction lines would likely confuse the user and degrade the performance of the system. FIG. 5B illustrates the operation of an additional creation angle for 135°.

Figure 6A:
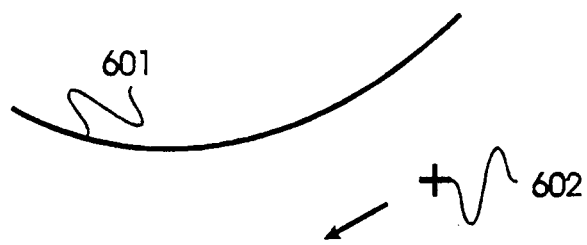
FIGS. 6A-C illustrate the use of temporary construction lines to find tangents.
Figure 6B:
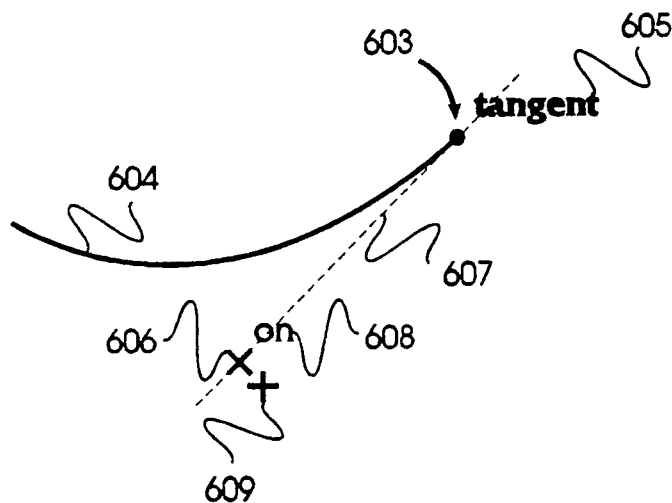
Figure 6C:
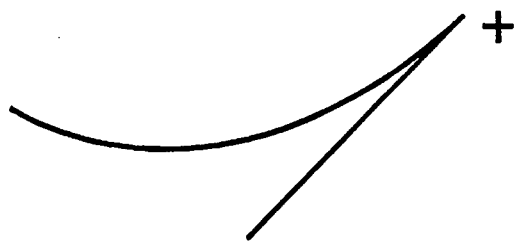

Temporary construction lines are also useful for finding tangents, perpendiculars, and even angles in between tangents and perpendiculars. By way of illustration and not limitation, the user may wish to construct a line which lies tangent to an existing curve. FIGS. 6A-C illustrate this interaction. FIG. 6A represents the cursor 602 as it moves towards an interesting point of the arc 601.

In FIG. 6B, as the cursor 609 passes by the arc 604, the geometric inference engine recognizes that the user may want to access the tangent from the arc's endpoint 603. In other words, the system recognizes that the cursor 609 is approaching an imaginary tangent from the endpoint 603. In response, the system creates the temporary construction line 607 and displays the "tangent" message 605. The secondary cursor 606 snaps onto the temporary construction line 607; juxtaposed is the "on" message 608 indicating that a control point, if placed now, would lie on the temporary construction line 607. FIG. 6C represents the completed illustration where the user draws a line to the arc's endpoint.

Figure 7A:
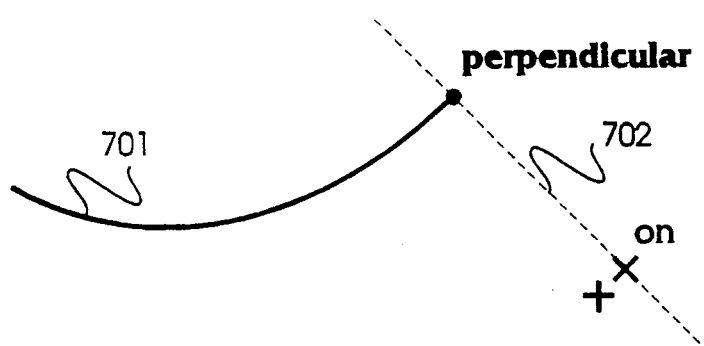
FIGS. 7A-B illustrate the use of temporary construction line to find perpendiculars.
Figure 7B:
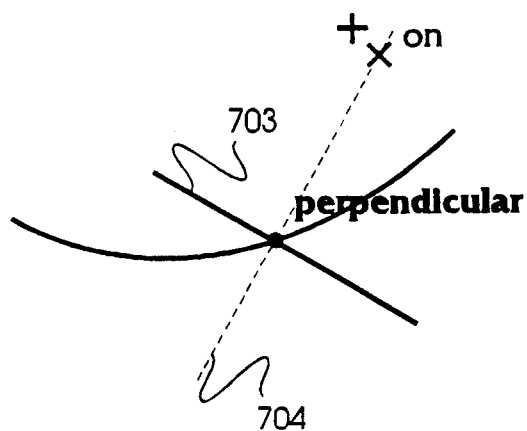
Figure 7C:
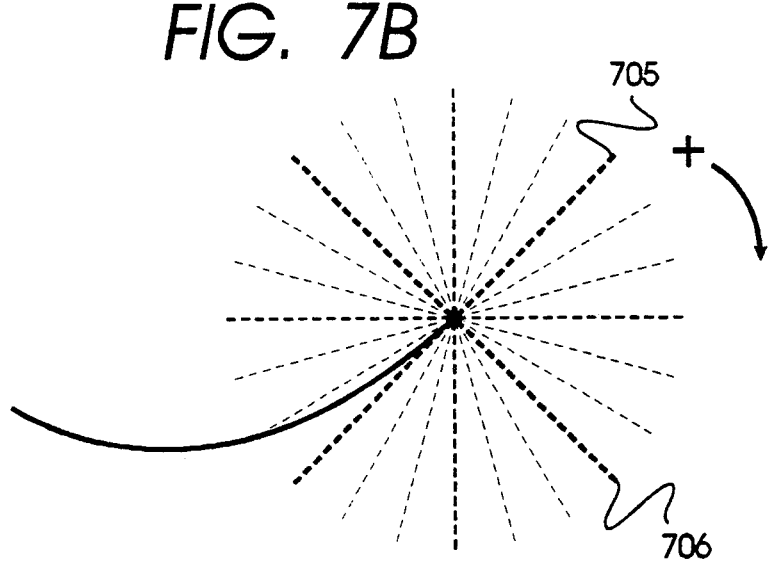
FIG. 7C illustrates the use of temporary construction lines to find angles in between a tangent and a perpendicular.

In a similar manner, the system locates perpendiculars. FIG. 7A exemplifies locating a perpendicular 702 for an arc 701, while FIG. 7B shows a perpendicular 704 for a line 703. Furthermore, the geometric inference engine can locate any angle in between a tangent and a perpendicular. In FIG. 7C, for example, angles located between the tangent 705 and the perpendicular 706 are found.

Figure 8A:
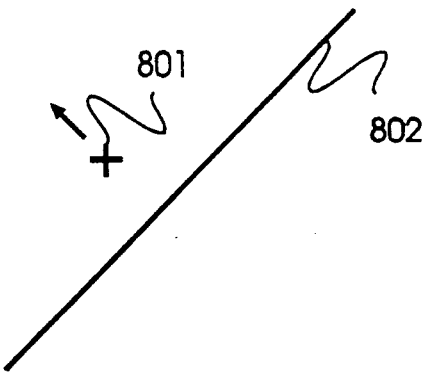
FIGS. 8A-B illustrate the use of temporary construction lines to find offsets.
Figure 8B:
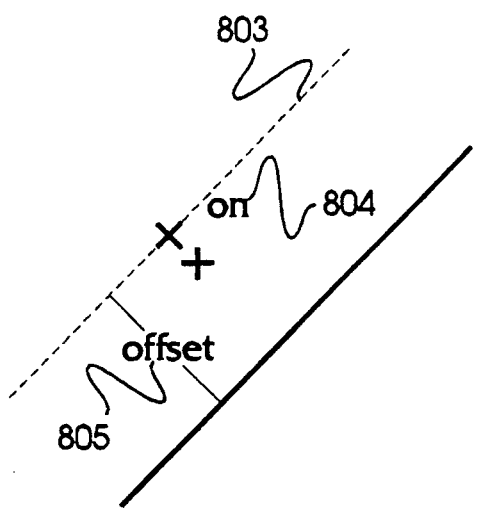

The present invention contemplates other applications for temporary construction lines. Offsets are temporary construction lines which parallel existing geometry. In the preferred embodiment, the degree of offset is user adjustable. FIGS. 8A-B illustrate offsets. In FIG. 8A, the user moves the cursor 801 away from the line 802. In FIG. 8B, when the cursor reaches a distance equal to the offset, the system displays the temporary construction line 803. The messages "on" 804 and "offset" 805 are displayed as feedback.

Figure 9:
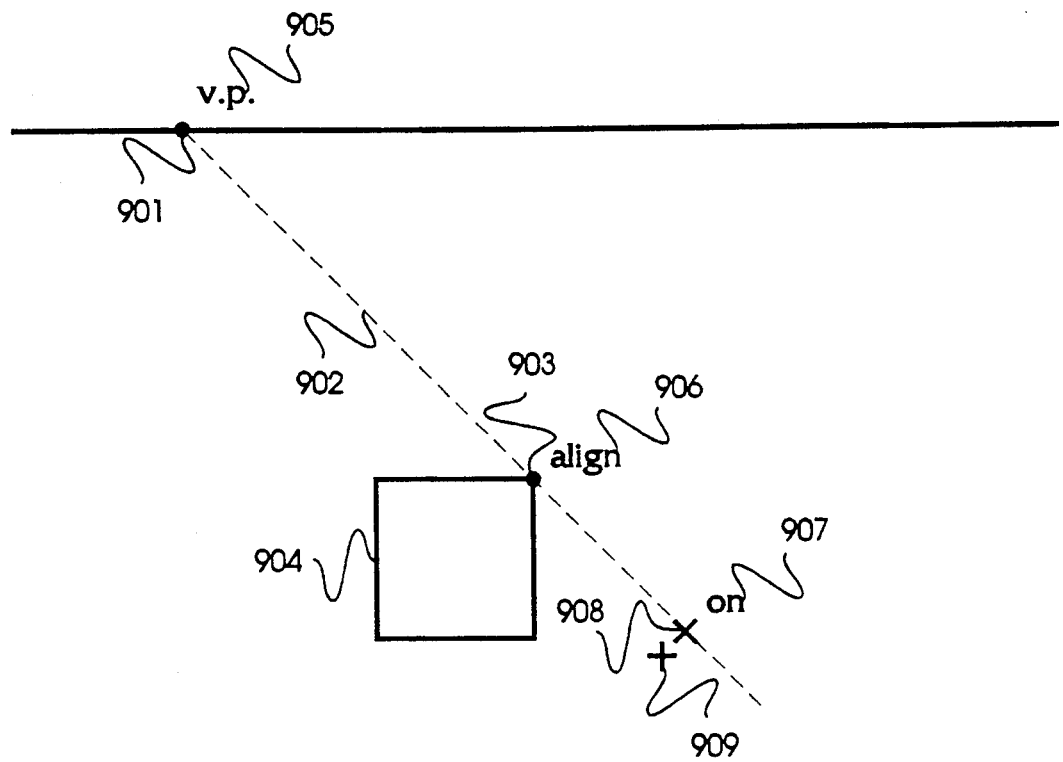
FIG. 9 illustrates the use of a temporary construction line with a single vanishing point.

In addition, the user may specify one or more vanishing points through which construction lines must pass. FIG. 9 illustrates the interaction of actual geometry with a single vanishing point for line drawing. Temporary construction line 902 represents an imaginary axis which passes through the vanishing point 901 and the corner 903 of the box 904. For screen feedback, the screen message "v.p." 905 highlights the vanishing point 901, "align" 906 indicates alignment with the corner 903, and "on" 907 signifies that the secondary cursor 908 has strayed away from the primary cursor 909 and onto the temporary construction line 902.

Figure 10A:
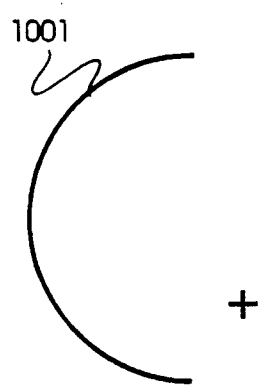
FIGS. 10A-C illustrate the use of a temporary construction circle to maintain precise polar relationships.
Figure 10B:
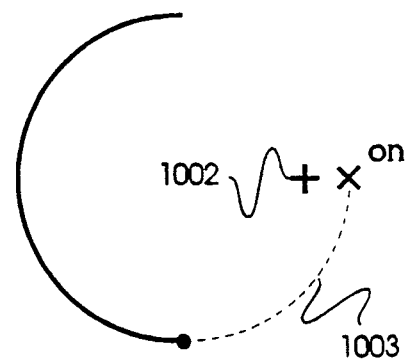
Figure 10C:
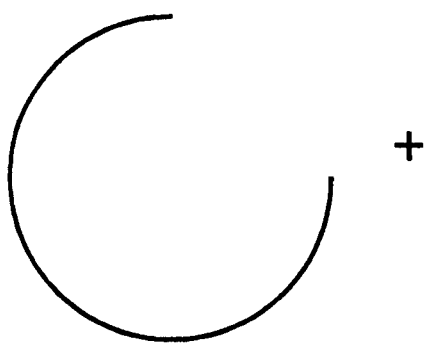

Temporary geometry is extended to polar geometries by the user of temporary construction circles. There are times when polar relationships, not rectangular, are important to the user. FIGS. 10A–C illustrate the operation of temporary construction circles. In FIG. 10A, the user wishes to extend the arc of the semicircle 1001. In FIG. 10B, as the cursor 1002 moves to extend the arc, the temporary construction circle 1003 is displayed to aid the user in the placement of a new arc endpoint. Thus, the user need not concern himself with the arc radius which is held constant. FIG. 10C represents the completed drawing.

Figure 11A:
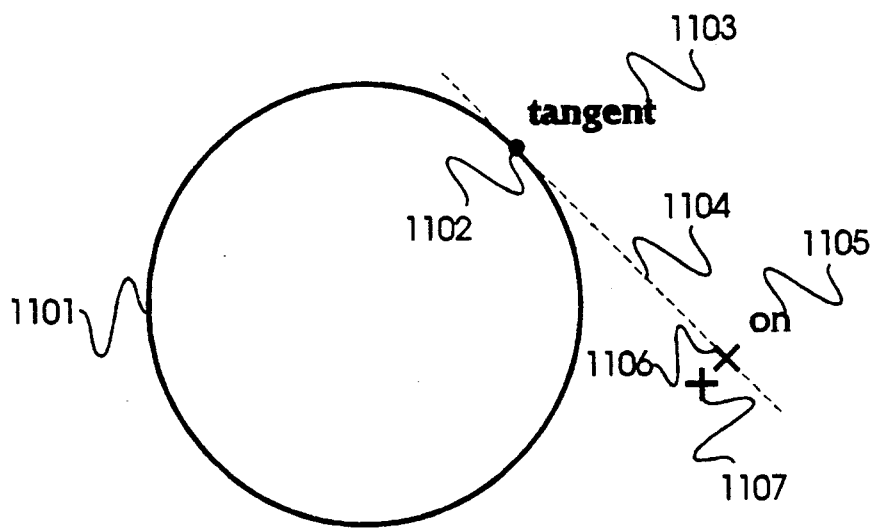
FIGS 11A-B illustrate the construction of temporary construction lines for tangents in conjunction with the maintenance of a set of active points.

FIG. 11A illustrates the locating of a tangent from any given point on a circle. The user clicks (enters with the mouse) a point 1102 on the circle 1101, for example, to place the first control point for a new line. This point 1102 becomes the current point. As the cursor 1107 approaches the tangent for the circle 1101 at the current point 1102, a temporary construction line 1104 is displayed along with the "tangent" message 1103. The secondary cursor 1106 migrates onto this line 1104; a confirmatory "on" message 1105 is displayed.

Figure 11B:
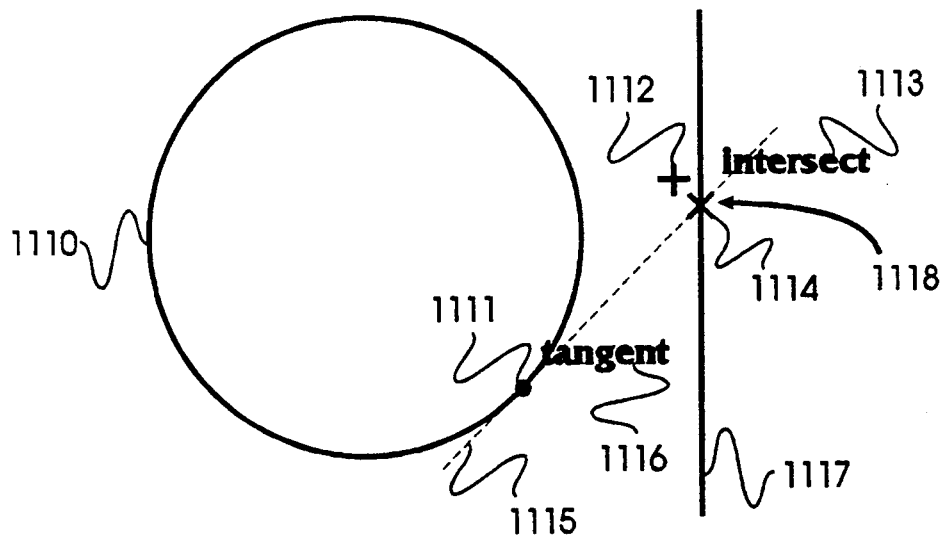
Figure 12A:
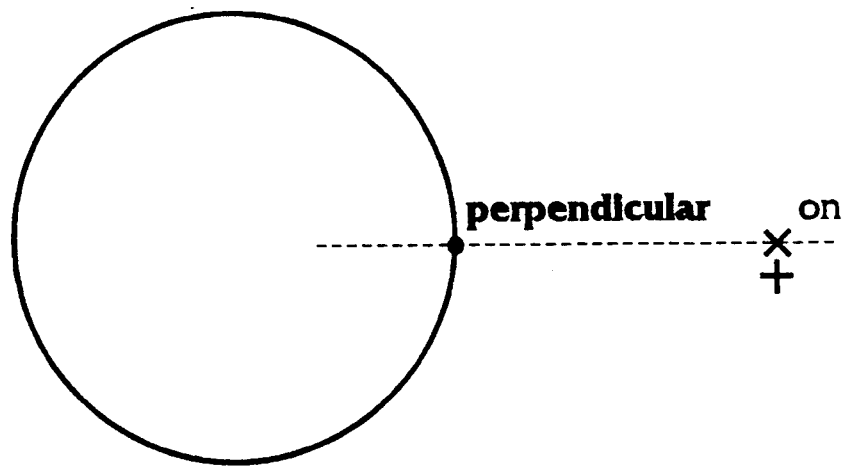
FIGS. 12A-B illustrate the determination of temporary construction lines for perpendiculars which depends upon the maintenance of a set of active points.
Figure 12B:
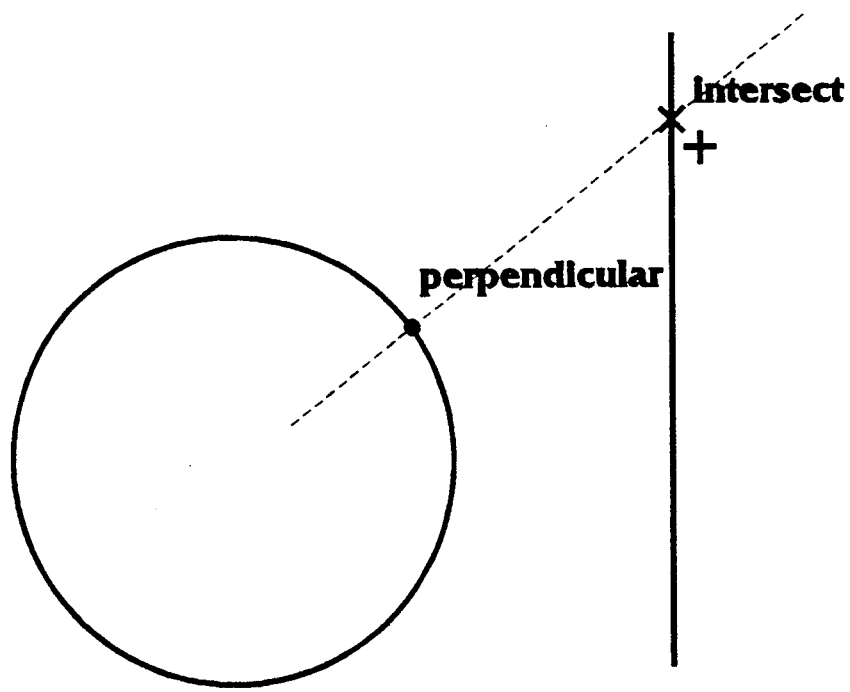

FIG. 11B illustrates this concept for multiple objects. The user enters a point 1111 on the circle 1110. The point 1111 is now the current point. When the cursor 1112 approaches the tangent for the circle 1110 at the current point 1111, a temporary construction line 1115 is displayed along with "tangent" 1116. However, in this case, the cursor 1112 is also near the intersection 1118 of the line 1117 with the temporary construction line 1115. The geometric inference engine identifies this by placing the secondary cursor 1114 on the intersection 1118 and displaying the screen message "intersect" 1113. Thus, a temporary construction line, once created, may interact with another existing object to create additional interesting points (e.g., intersection 1118). FIGS. 12A–B illustrate similar examples for perpendiculars.

Figure 13:
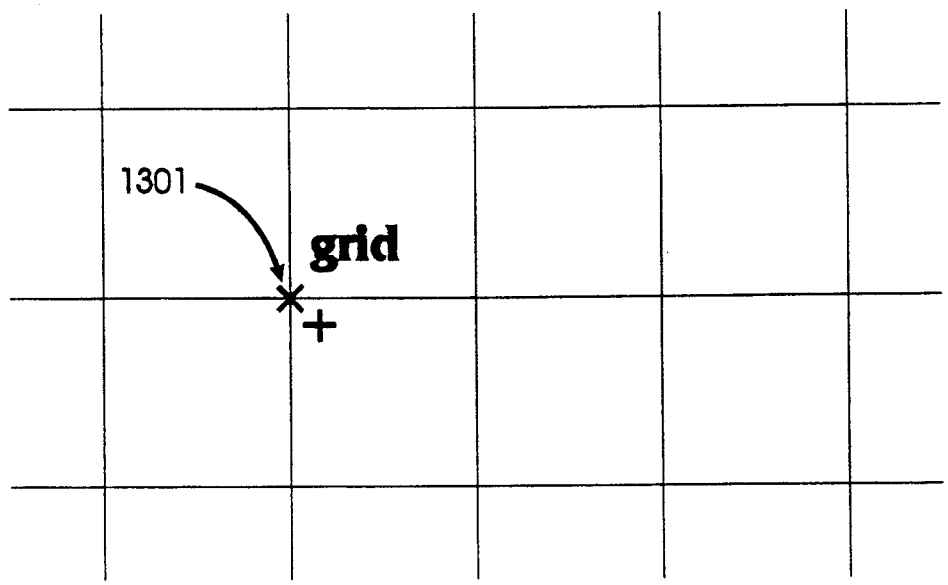
FIG. 13 illustrates a simple grid point as an interesting point.

The use of interesting points with grids provides new points with which the user may interact. In prior systems, it is only the grid "points" or intersections of grid lines which are interesting, i.e., "snap" active. As FIG. 13 illustrates for a two-dimensional grid, the geometric inference engine also identifies these points (e.g., grid point 1301) as interesting.

Figure 14:
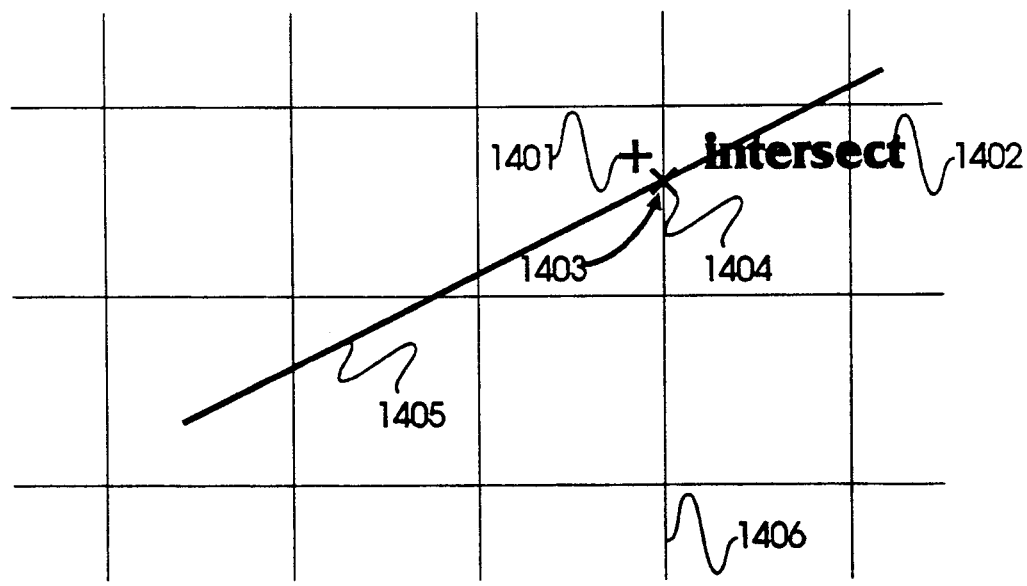
FIG. 14 illustrates the interaction between a user-drawn line and a grid line.
Figure 15:
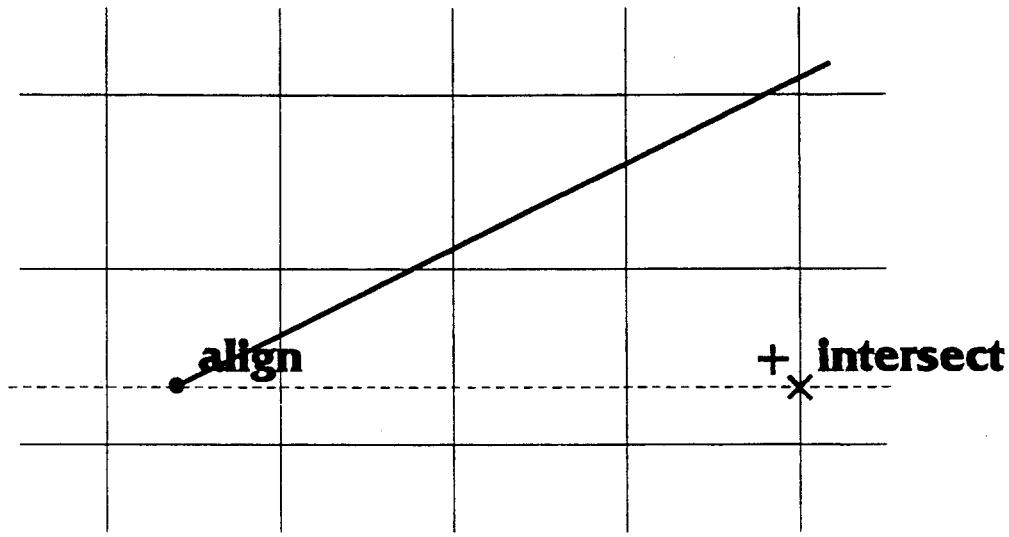
FIG. 15 illustrates the interaction between a temporary construct line and a grid line.

In the preferred embodiment, however, the geometric inference engine also identifies the interaction of grid lines with temporary or permanent geometry as interesting. FIG. 14 illustrates this interaction. The intersection of permanent geometry 1405 with grid line 1406 generates an interesting point 1403. Thus, the secondary cursor 1404 is attracted to this location 1403 and the "intersect" message 1402 is displayed as the cursor 1401 approaches. FIG. 15 illustrates the interaction of temporary geometry with grid lines.

In the preferred embodiment, novel screen feedback techniques are provided to augment the utility of interesting points. Combining a secondary cursor with temporary geometries further increases drawing accuracy. The advantages are two-fold. First, the actual cursor need not be exactly at an "interesting location" to find interesting points. In other words, when the actual cursor is within the "hit radius" of an interesting location, the system may display interesting points without disrupting the position of the actual cursor. The secondary cursor is allowed to snap to the interesting point (or temporary geometry, if applicable) while the actual cursor maintains its current position. This allows even the novice user to interact precisely with interesting points. Second, the secondary cursor gives the user a preview of where the actual cursor's position will map to when a control point is placed.

In the preferred embodiment, interesting points are also used for transformation operations, such as mirror, rotation, scale, and shear. In prior systems, transformations are accomplished by dragging images (XOR techniques) or by keyboard entry. Neither of these methods accomplish precise and efficient transformations.

Figure 16A:
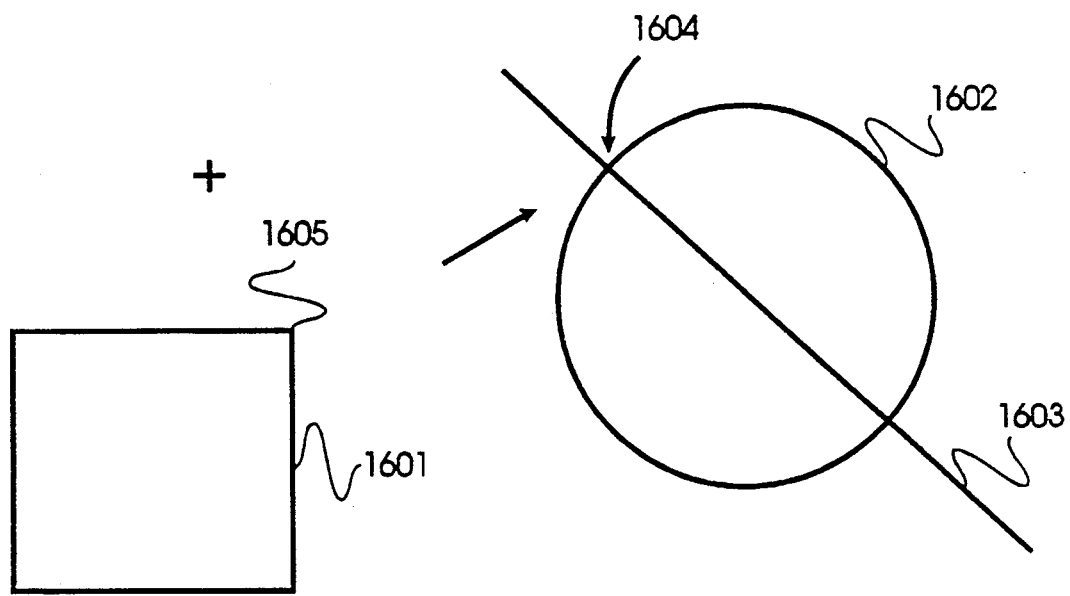
FIGS. 16A-B illustrate a precise move transformation operation with the aid of interesting points.
Figure 16B:
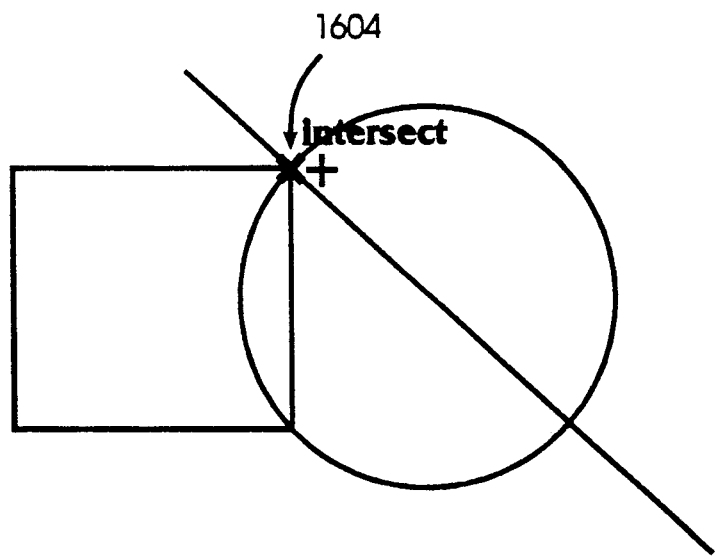

FIG. 16 illustrates a transformation operation with the aid of interesting points. The square 1601 is dragged (move transformation) to a new location with the aid of interesting points. Here the first interesting point 1605, the corner of the square 1601, is dragged to the second interesting point 1604, the intersection of the circle 1602 with the line 1603. This technique enables the user to perform transformations with computer precision while maintaining the efficiency of object-dragging methods.

Geometric Inference Engine: ptSnap

The internal processes of the geometric inference engine will now be described in detail. The ptSnap function, which is called whenever the mouse moves, is central to the operation of the geometric inference engine. For a given location on the screen, ptSnap locates the nearest geometry.

It is helpful at the outset to study the data structure which ptSnap uses. ptSnap is passed p, a pointer structure variable of type snap_record. The input values in p comprise the following:
a) probe: a variable of type Point which specifies the current screen location of the cursor.
b) hitrad: an integer variable which specifies the hit radius in pixels.
c) method: a character string which specifies the order in which different interesting points are tested by ptSnap; the string is initially defined globally but is changed locally within each individual function.
d) nprev: an integer variable which counts the number of points which are considered special.
e) prevPt: an array of points that the user wants alignment to, the last point (array member) being the location from where the alignment line is drawn.
f) tangentV is an array of real numbers which is used to constrain operations, such as drawing or transformations, to lie within a particular tangent.

The values ptSnap calculates and stores, i.e., the output variables, comprise the following:
a) pt: an array of three reals which specifies the actual point found.
b) type: an integer variable used to specify the ASCII value of the method used to find pt, for example, "i" (ASCII 105) for intersection or "t" (ASCII 116) for tangent.

c) userch: a character variable which allows the user to modify the method string.
d) nobj: an integer variable which specifies the number of objects used in a method. In freepoint, for example, nobj is equal to 0 since it is not related to any geometry. nobj is equal to 1 for endpoints and equal to 2 for intersections.
e) obj: an array of pointers to records of type gobject which specifies the objects used.
f) objFlag: an integer array used to specify whether an object is permanent or temporary geometry.
g) niter: an integer variable used to count the number of iterations through the loop.
h) objT: an array which stores the t values for objects parametrically defined.
i) tanvect, tanvectsiz, and tanvectcnt: store the tangent and perpendicular information for a given point. tanvect is a pointer variable to an array of reals where the tangent and perpendicular vectors are stored. tanvectsiz stores to size of the array, while tanvectcnt stores the number of such vectors.

In the C language (Kernighan, B. and Ritchie, D., The C Programming Language, Second Edition, Prentice Hall, 1988), the snap_record is defined by the following statements:

```
struct snap_record {
    /* input values */
    Point probe;            /* cursor point */
    int hitrad;             /* hit radius in pixels */
    char *method;           /* string describing auto method */
    int nprev;              /* number of previous points */
    POINT3D *prevPt;        /* array of prev points */
    REAL tangentV[3];       /* tangent vector */
    /* output values */
    REAL pt[3];             /* result point */
    int type;               /* method used to find pt */
    char userch;            /* user char, overrides method
                               string */
    int nobj;               /* # of objects used in method */
    struct gobject *obj[2]; /* the objects used */
    int objFlag[2];         /* object flags */
    int flags;              /* flags */
    int niter;              /* number of iterations */
    EXTENDED objT[2];       /* t values of objects */
    UINT tanvectcnt;        /* number of tangent vectors */
    UINT tanvectsiz;        /* array siz */
    REAL *tanvect;          /* tangent vectors */
```

Another data structure important in the operation of ptSnap is snap_data, a locally defined record. It comprises the following variables:
a) snaprecord: a pointer of type snap_record.
b) bestpt, bestdist, and besttype: store the best point found, its distance from the probe, and its type, respectively. These variables are collectively referred to as the best record.
c) snapobj: a pointer to snapobjs, an array which stores the objects found within the hit radius.

Figure 17A:
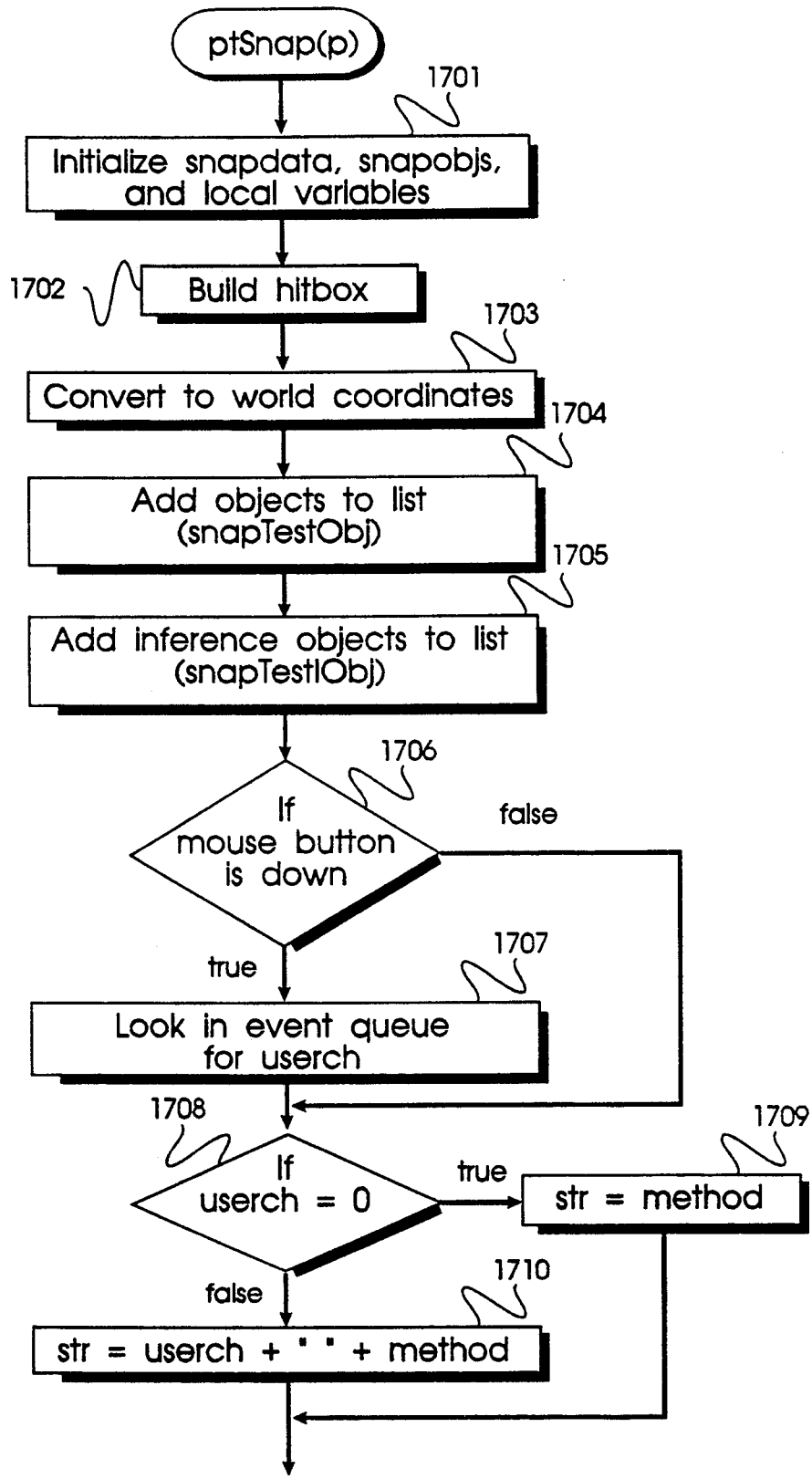
FIGS. 17A-B are flow diagrams for the ptSnap function.
Figure 17B:
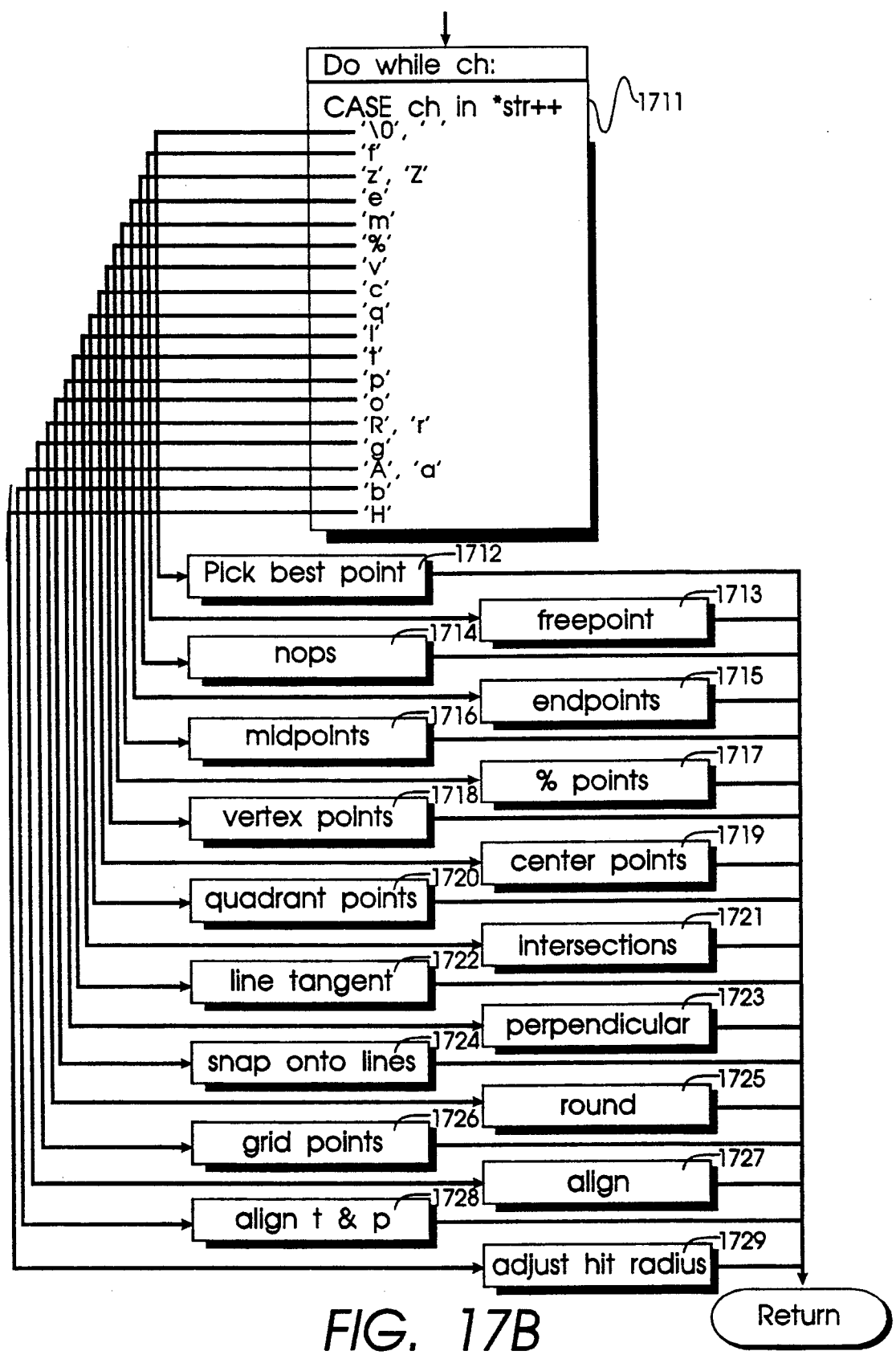

FIGS. 17A-B illustrate the operation of ptSnap. At step 1701 the function sets up local copies of the snapdata and snapobjs records and initializes local variables. At step 1702, a hitbox is constructed by calculating the four corners of a box whose distance from the probe equals hitrad. In step 1703, these points are converted to world coordinates. In step 1704, the function snapTestObj is passed an object and the snap_record pointer p. For each object within the hitbox, snapTestObj tests whether it is close enough to the user probe to be considered part of the active geometry.

Figure 18A:
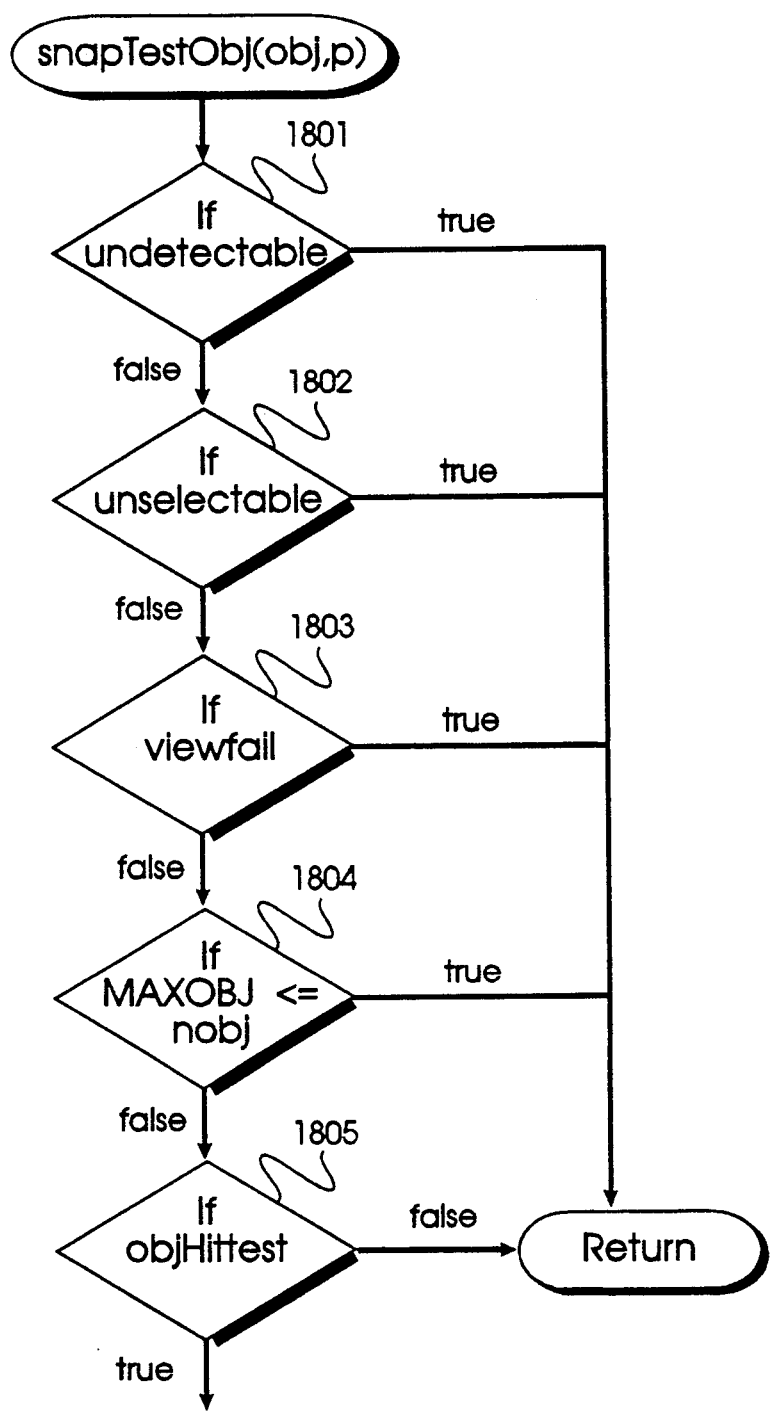
FIGS. 18A-B are flow diagrams for the snapTestObj function.
Figure 18B:
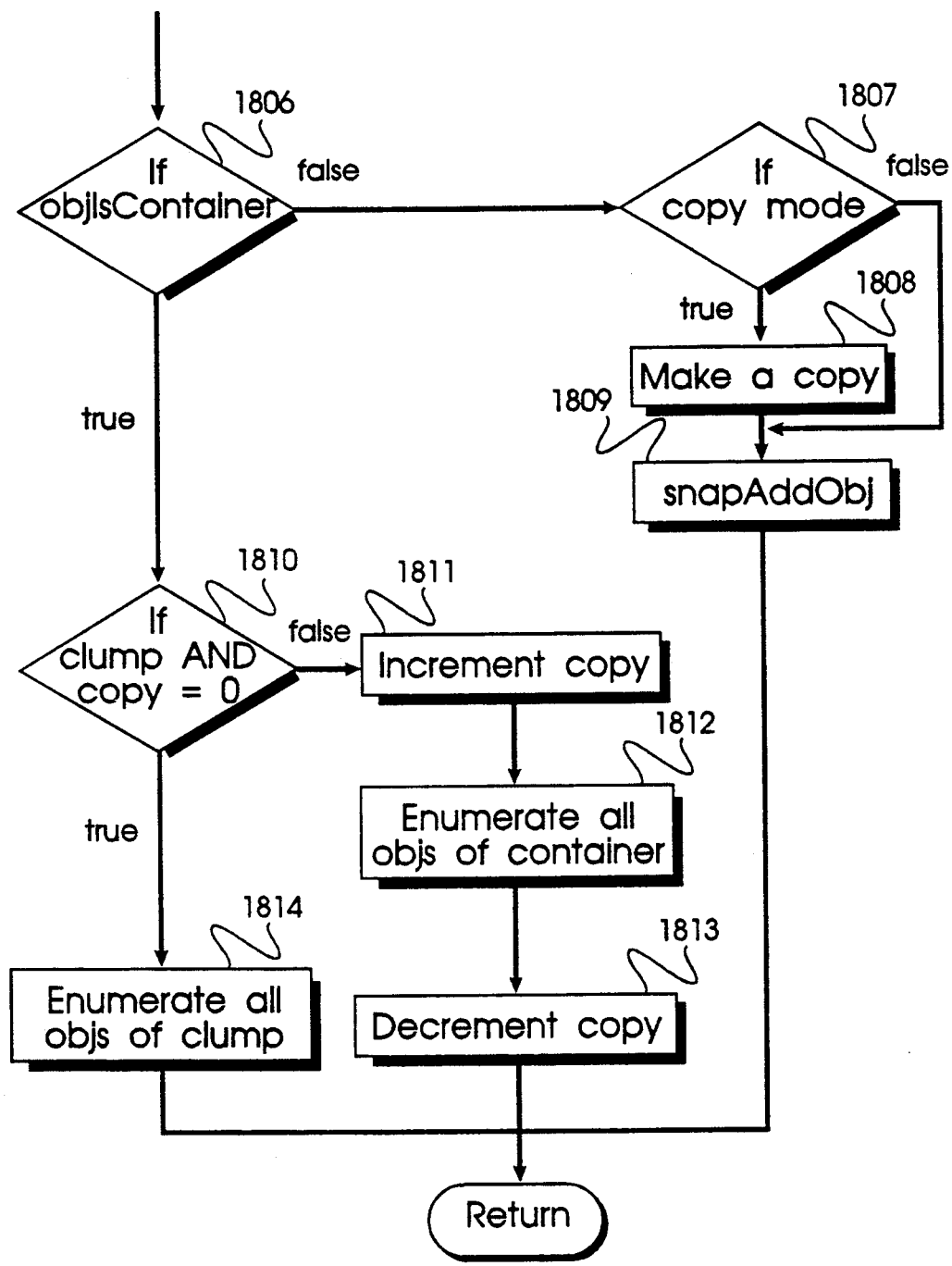

FIGS. 18A-B illustrate the steps of snapTestObj. At step 1801, the function checks whether the object passed is undetectable. For example, an object is undetectable while it is being created. For undetectable objects, the snapTestObj function returns; otherwise, it goes to step 1802 to check whether the object is unselectable. An object is unselectable if it is masked from the system. For example, the user may wish to mask out objects of certain colors, objects located in certain layers, or objects of a particular geometry. For unselectable objects, the function returns. At step 1803, the function tests whether a given object is capable of being displayed at the current view. If viewfail is set to true (non-zero), the function returns. Step 1804 confirms that the number of objects (nobj) does not exceed the object array, i.e., nobj is not equal to or greater than the maximum allowed objects. At step 1805, objHittest is called to make sure that the object passed to snapTestObj is within the hitbox. If it is not, then snapTestObj returns.

As FIG. 18B illustrates, at step 1806, snapTestObj checks whether the object is a container. An object which comprises a group of objects is a container. For example, a box, which comprises a group of lines, is a container. Primitive objects, such as lines or arcs, are not containers. Since the geometric inference engine is only interested in snapping to primitive objects, containers are broken down into their primitive members. If at step 1806, an object is not a container, then at step 1807, snapTestObj checks whether the system is in copy mode. If so, then at step 1808, a copy is made. Otherwise, at step 1809, the function calls snapAddObj which adds the currently passed object to the object list.

However, if the object is a container at step 1806, then at step 1810, the function checks whether the container is a "clump," i.e., a container defined by four lines. If the container is a clump and copy mode is off, then at step 1814 the function enumerates all the objects in the clump by calling snapTestObj recursively.

Container objects which are not clumps at step 1810, e.g., symbols, require additional steps since only one copy exists for each in the system. Thus, at step 1811, the copy flag is incremented before the objects of the container are enumerated at step 1812. This allows for a copy transformation, assuring that each object is properly placed. At step 1813, the copy flag is decremented and snapTestObj returns.

Figure 19:
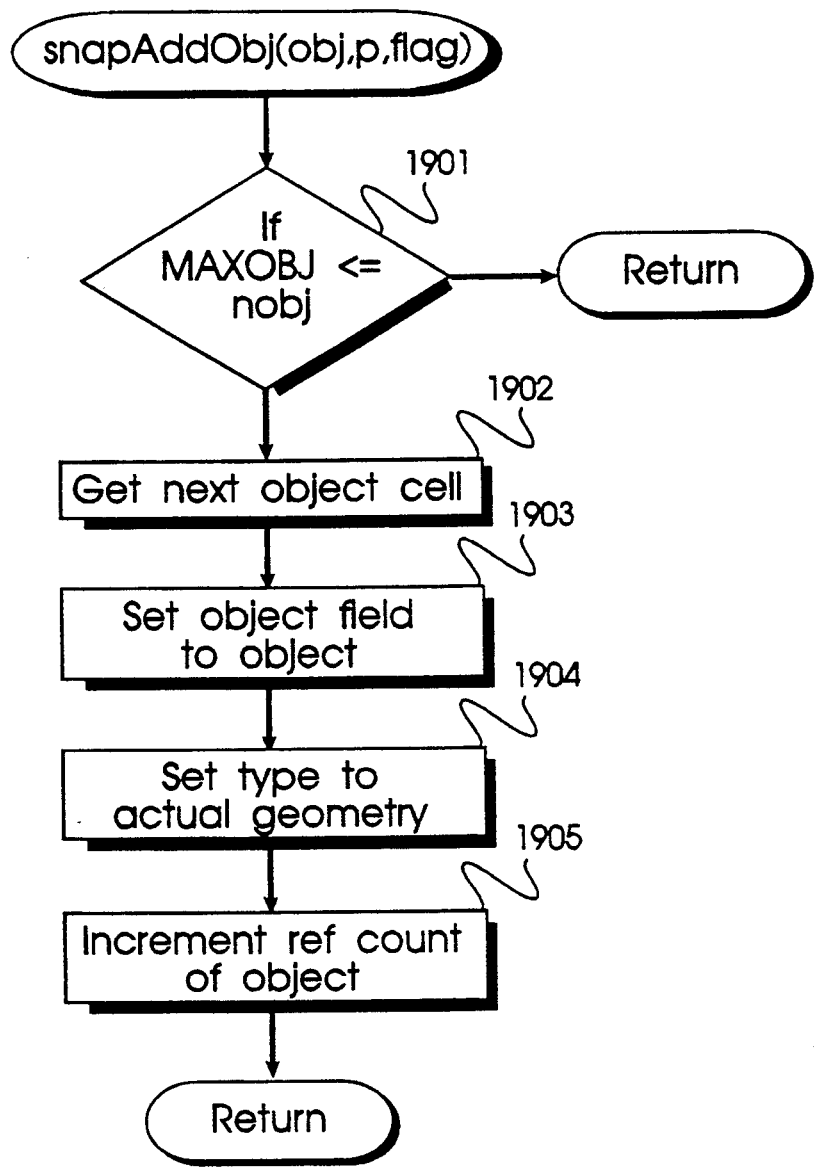
FIG. 19 is a flow diagram for the snapAddObj function.

FIG. 19 illustrates the snapAddObj function. It is called with an object, snap_record, and a copy flag. At step 1901, the function checks whether the bounds of the object array are exceeded. At step 1902, the function gets the next object cell from p. At step 1903, the object field of the object cell is set equal to the object that is past in. The object type is set equal to actual geometry (type=0) in step 1904. At step 1905, the reference count of the object is incremented to facilitate freeing it later. snapAddObj returns to snapTestObj which returns to ptSnap.

At the completion of step 1704 in ptSnap, all the actual geometry in the neighborhood of the probe is elucidated. At step 1705, ptSnap repeats this process for inference objects. ptSnap calls snapTestIObj, a function similar to snapTestObj except that the object types are not actual geometry.

The priority in which ptSnap seeks interesting points is determined by the "method" string. A default method is defined globally, but the user may override this by pressing a key on the keyboard. Steps 1706-1710 test for this condition. If the mouse button is still down in step 1706, then at step 1707 ptSnap checks the event queue for a user character (userch). If there is no user character in step 1708, then the local method string (str) is set to the global method at step 1709. However, if there is a user character, it is given priority at step 1710 by placing it and a space character (ASCII 20) at the beginning of the method string, i.e., str=userch +' '+ method. The space character has special significance: ptSnap checks the condition, defined by userch, first and returns if it exists. For example, if the global method is set to "miqp" (midpoints, intersections, quadrant points, and perpendiculars) and the user presses 't' (tangents), then ptSnap will change the method string to "t miqp." In this case, tangents are sought and returned before all other interesting points.

FIG. 17B illustrates the case statement which directs ptSnap's investigation for interesting points. At step 1711, ptSnap sequentially tests for different interesting point types, the order of search being specified by the character sequence in the method string. For each type of interesting point, the best point (bestpt), if any, is determined and returned to the geometric inference engine. However, for efficiency, ptSnap returns without any point when there is a timeout error, e.g., when the cursor moves to a new screen location before any best point is located.

The individual case arms for step 1711 will now be examined. For consistency, the C language convention of using single quotes for character values and double quotes for strings is adopted.

Figure 20A:
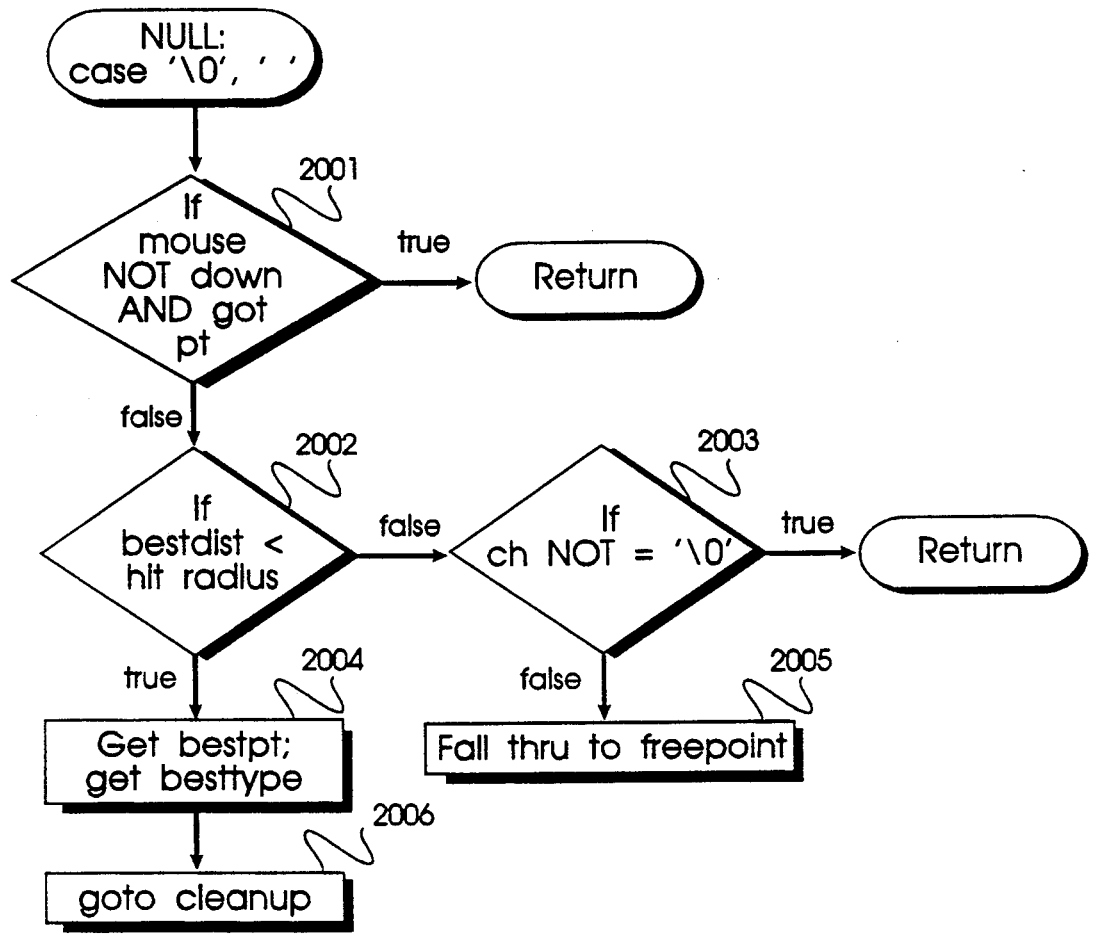
FIG. 20A is a flow diagram for the null case arm in the ptSnap function.

If ch is equal to ' 0' (null or string terminating character) or ' ' (ASCII 20 or space character), then ptSnap immediately picks the best point (bestpt) in step 1712. FIG. 20A illustrates this method. In step 2001, if the mouse button is not down and a valid point already exists, the function returns. Otherwise, if the best distance (bestdist) found is less than the hit radius (hitradSq) in step 2002, then at step 2004 the function returns the current point and object type as the bestpt and besttype.

In the preferred embodiment, integers and squared values are favored to minimize slower floating point operations. For example, bestdist is actually the square of the pixel distance from the probe to the bestpt. Similarly, hitradSq, the square of hitrad, is used to test the hit radius.

After getting the best point and type at step 2004, the function goes to the cleanup routine in step 2006. However, if the best distance is not less than the hit radius in step 2002, then at step 2003 the function tests whether or not the character is null, i.e., ' 0'. If it is, the function falls through (continues y) to the next case arm—freepoint. Otherwise, it returns.

Figure 20B:
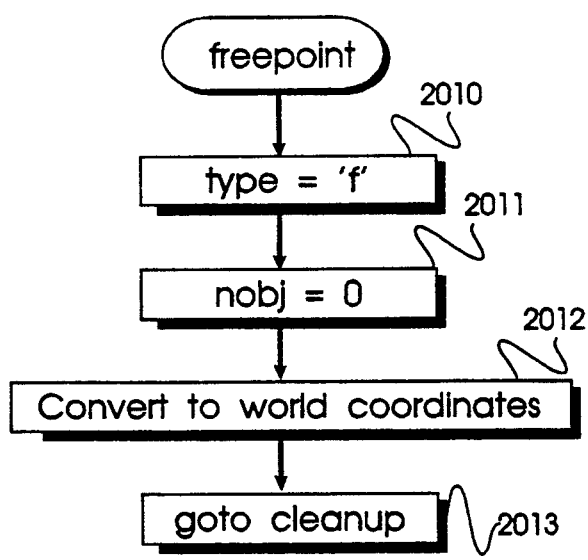
FIG. 20B is a flow diagram for the freepoint case arm in the ptSnap function.

If the character is 'f' at step 1711, ptSnap determines the freepoint at step 1713. Freepoint allows the cursor to freely move without any "snapping" or constraints. FIG. 20B illustrates the steps of the freepoint case arm. At step 2010, type is set equal to 'f', and at step 2011 the number of objects (nobj) is set equal to 0. At step 2012, the point is converted to world coordinates, and the function goes to cleanup at step 2013.

For the case of ch equal to 'z' or 'Z', in step 1711, ptSnap goes to step 1714 which performs no operation (nops). No further steps are presently implemented for this case arm.

Figure 20C:
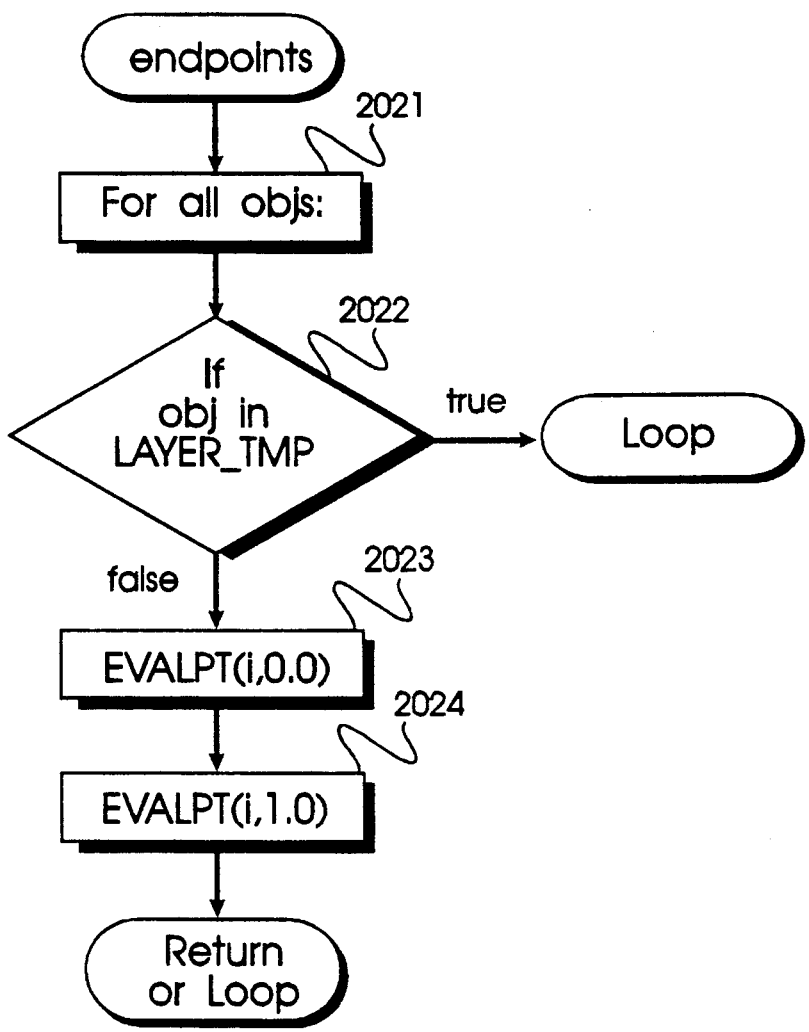
FIG. 20C is a flow diagram for the endpoints case arm in the ptSnap function.

For the case of ch equal to 'e' in step 1711, ptSnap determines endpoints at step 1715. FIG. 20C illustrates the steps for calculating endpoints. At step 2021, the function sets up a loop so that all objects are examined. At step 2022, if the object is in a temporary layer, i.e., a construction object, the function loops. Otherwise, the function calculates the object's endpoints.

ptSnap calculates endpoints by calling the EVALPT macro with the object index and a parametric value, t. At step 2023, the first object endpoint is calculated by calling EVALPT with t=0.0. The second endpoint is calculated in step 2024 by calling EVALPT with t=1.0.

Figure 20D:
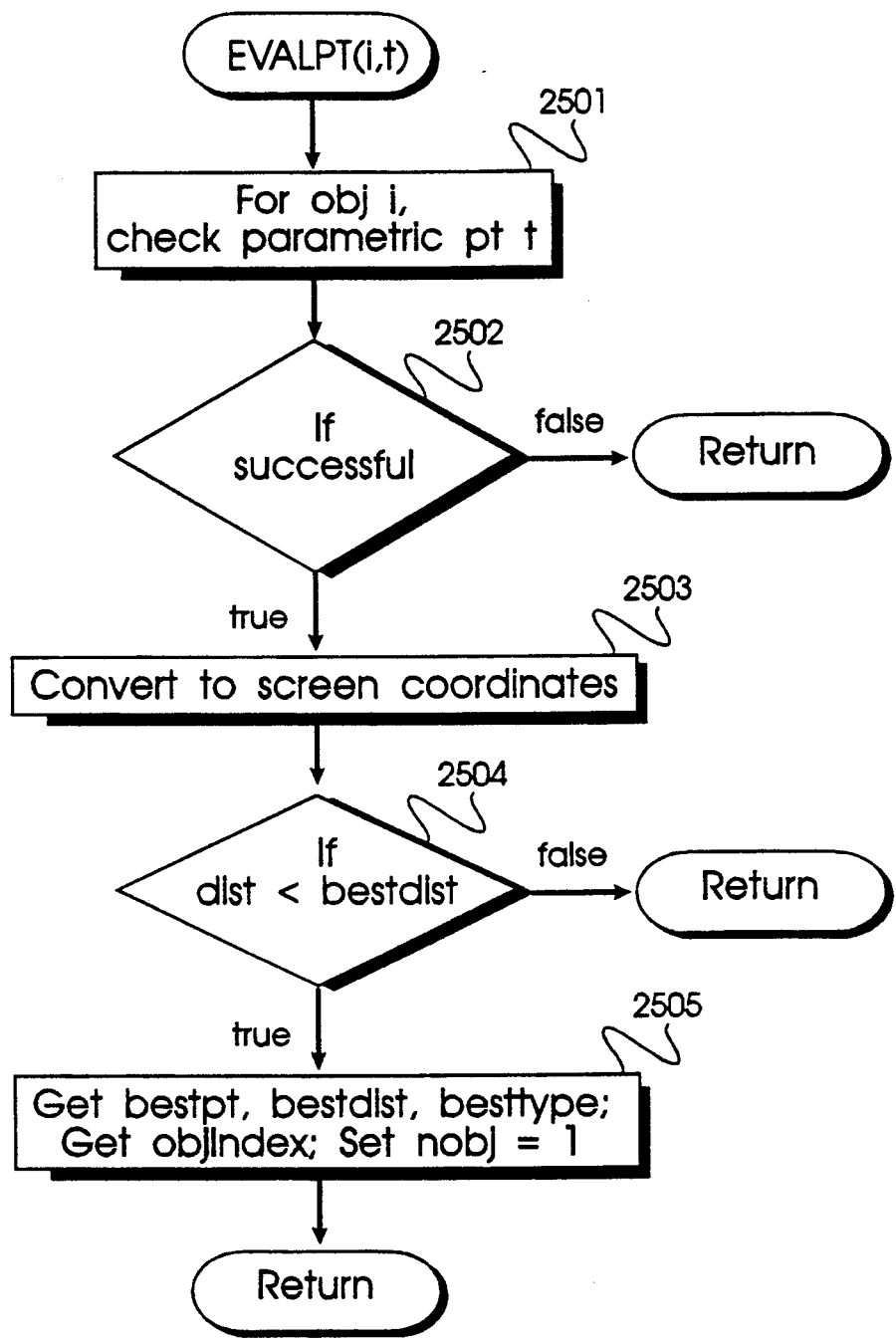
FIG. 20D is a flow diagram for the EVALPT macro.

FIG. 20D illustrates the steps of EVALPT. At step 2501, for the object of index i (obj[i]), the function checks the parametric point, t, which is passed. At step 2502, if there is no parametric point on the object, the function returns. Otherwise, at step 2503, the point is converted to screen coordinates. At step 2504, if the distance from the point to the probe (dist) is not less than the current best distance (bestdist), then the function returns. Otherwise, at step 2505, the best record (bestpt, bestdist, and besttype) is updated; the object's index is stored in the snapdata record; the number of objects is set equal to 1; and the function returns.

Figure 20E:
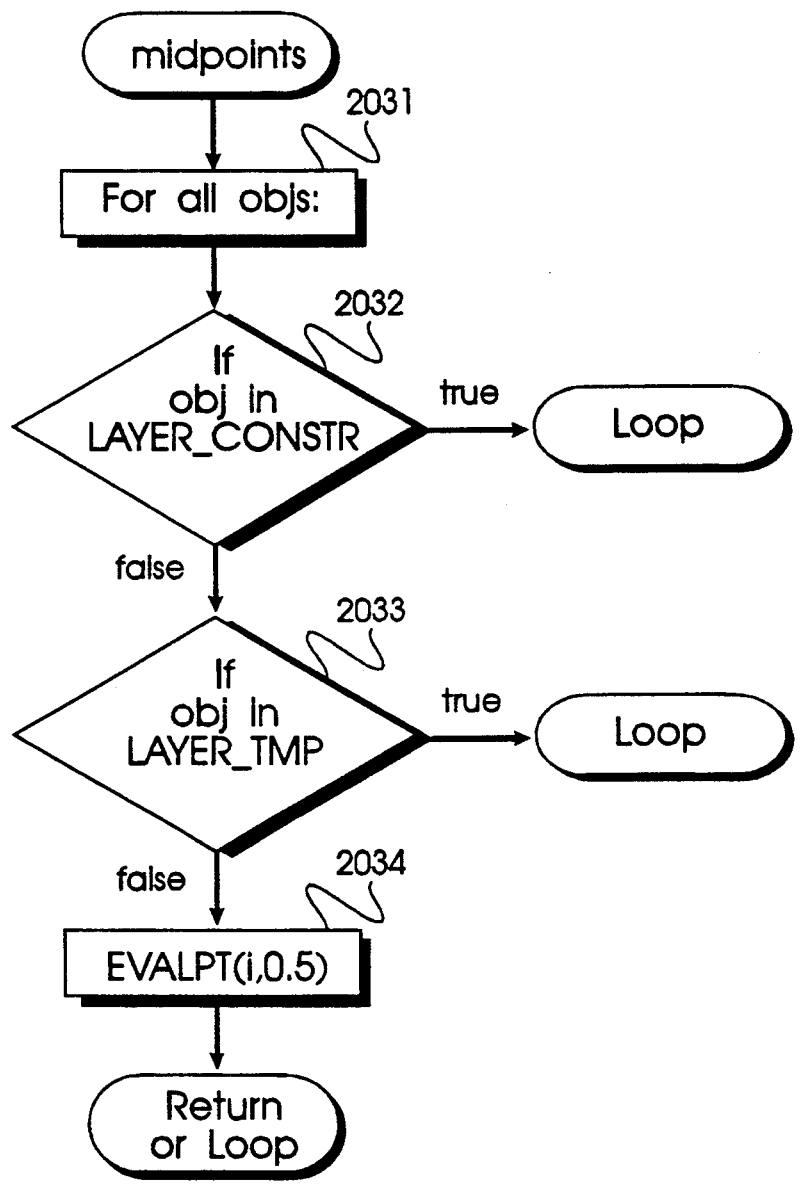
FIG. 20E is a flow diagram for the midpoints case arm in the ptSnap function.

If ch is equal to 'm' at step 1711, ptSnap determines midpoints at step 1716. As FIG. 20E illustrates, the process for midpoints is similar to that for endpoints. At step 2031, a loop is set up for all objects. Step 2032 checks whether the object is in the construction layer, while step 2033 checks whether the object is in the temporary layer. If either case is true, then the function loops to the next object. Otherwise, at step 2034, the index of the object and the t value of 0.5 are passed to EVALPT. The midpoint is returned.

Figure 20F:
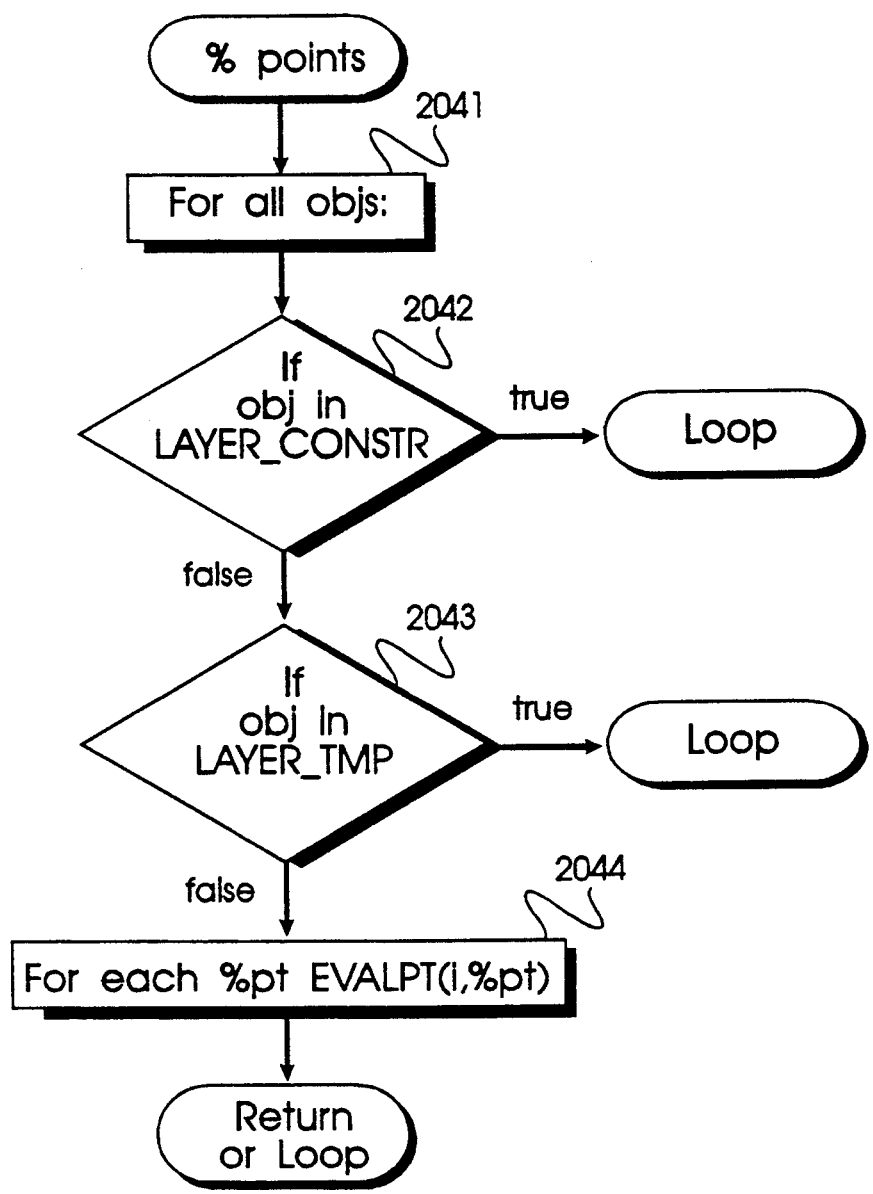
FIG. 20F is a flow diagram for the % (percent) points case arm in the ptSnap function.

For ch equal to '%', ptSnap determines the percent points at step 1717. Percent points allow the user to define intervals along an object as interesting points. For example, if the user wants the quarter intervals of a line to be interesting, he or she would enter 0.25 as the percent point. As FIG. 20F illustrates, the computation for percent points is similar to the midpoint and endpoint processes. At step 2041, a loop is set up for all objects. In step 2042, if the object is in a construction layer, or in step 2043 the object is in a temporary layer, the function loops to the next object. Otherwise, at step 2044, the object's index and percent point parameter is passed to EVALPT which returns any nearby percent point.

Figure 20G:
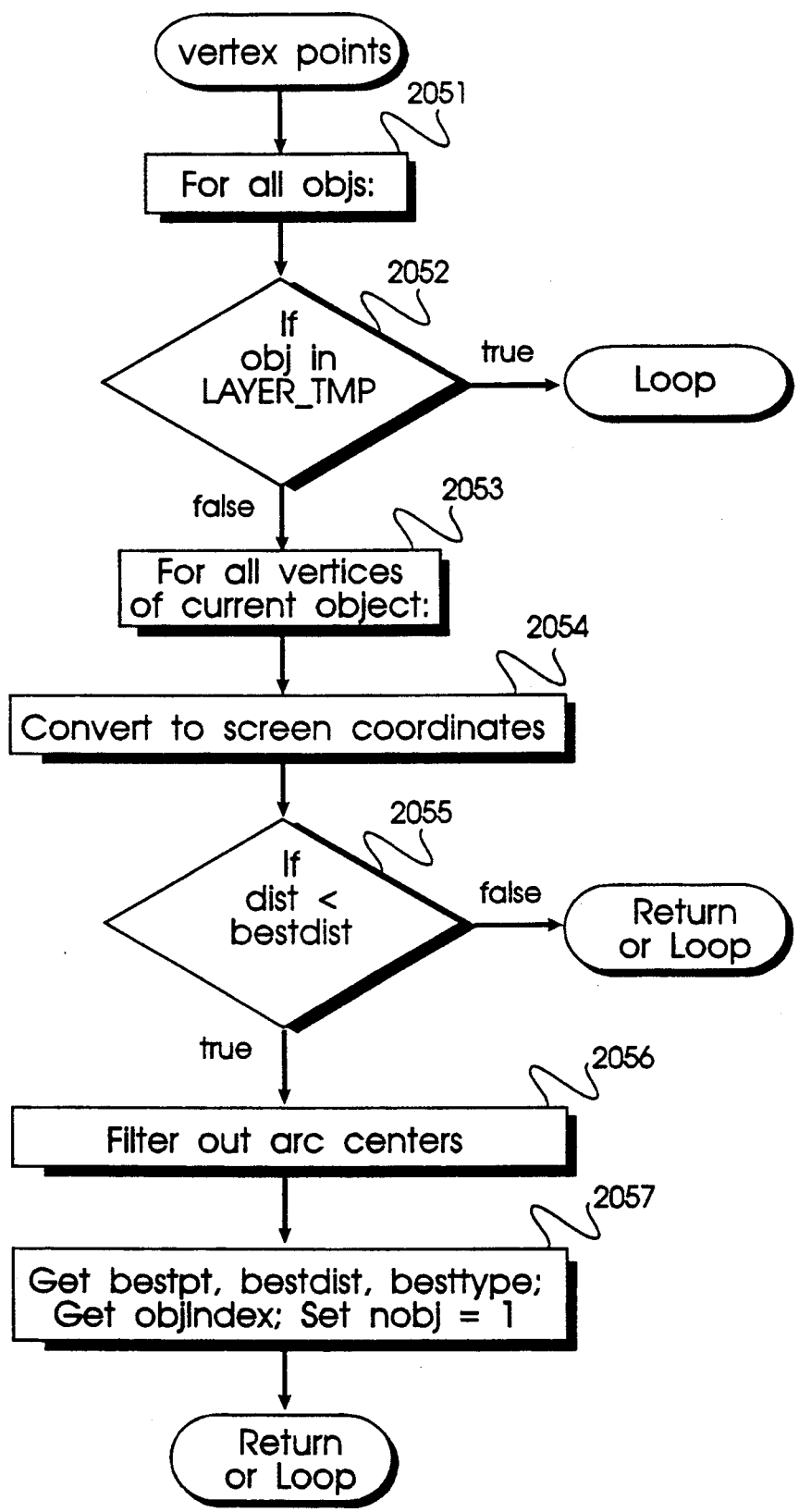
FIG. 20G is a flow diagram for the vertex points case arm in the ptSnap function.

If at step 1711, ch is equal to 'v', ptSnap determines the vertex or visible points at step 1718. Vertex points are the handles or "hot points" for an object. FIG. 20G illustrates the operation for vertex points. At step 2051, a loop is established to examine all objects. If the object is in the temporary layer at step 2052, the function loops to the next object.

The vertex points are determined in steps 2053–2057. A loop is established in step 2053 to examine vertex points computed from the point (pt) and snaprecord. At step 2054, the point is converted to screen coordinates. At step 2055, the distance from the probe to this point is tested against the bestdist. If the distance is not less than the bestdist, then the function returns. Since arc centers are preferably displayed as centers and not vertex points, at step 2056 the function filters out arc centers. At step 2057, the function stores the best record and object index, and sets the number of objects equal to 1 before returning.

Figure 20H:
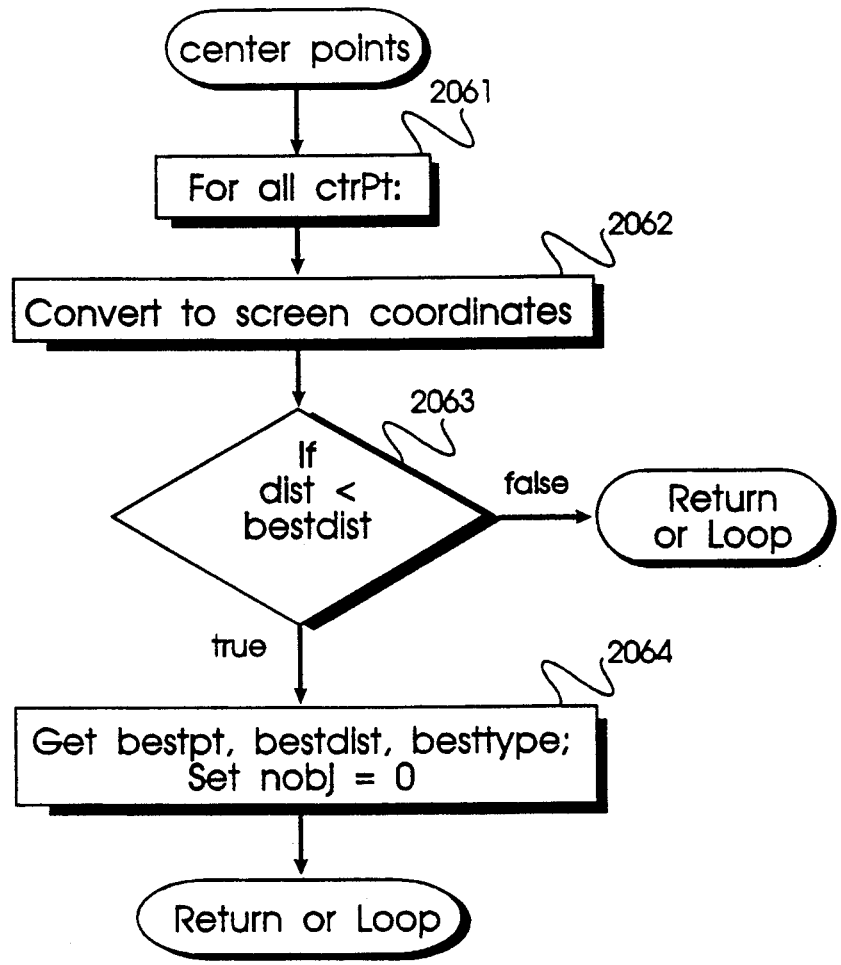
FIG. 20H is a flow diagram for the center points case arm in the ptSnap function.

For ch equal to 'c' at step 1711, ptSnap determines center points at step 1719. FIG. 20H illustrates the steps of this case arm. At step 2061, a loop is set up to test all control points (ctrPt). To avoid user confusion, ctrPt comprises the center points of only those arcs which the user has recently "touched" with the cursor. At step 2062, the ctrPt is converted to screen coordinates. If the distance from the probe to the ctrPt is not less than the bestdist at step 2063, then the function returns. If this is not the case, then at step 2064 the best record is stored and the number of objects is set equal to 0 before returning.

Figure 20I:
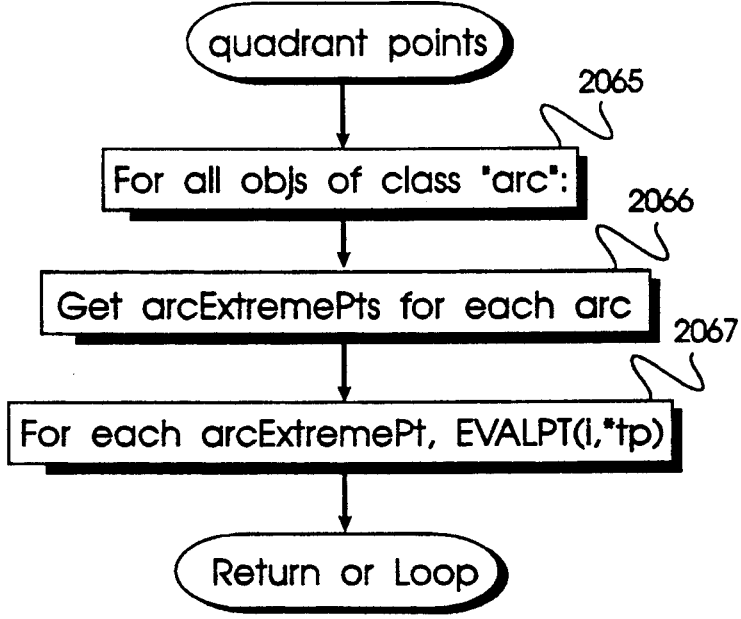
FIG. 20I is a flow diagram for the quadrant points case arm in the ptSnap function.

For ch equal to 'q' in step 1711, ptSnap determines quadrant points in step 1720. FIG. 20I illustrates the steps for determining quadrant points. At step 2065, a loop is set up for all objects of class "arc." At step 2066, the extreme points (right, left, top, and bottom) for each arc are determined. At step 2067, EVALPT examines each of the extreme points and returns the quadrant point.

Figure 20J:
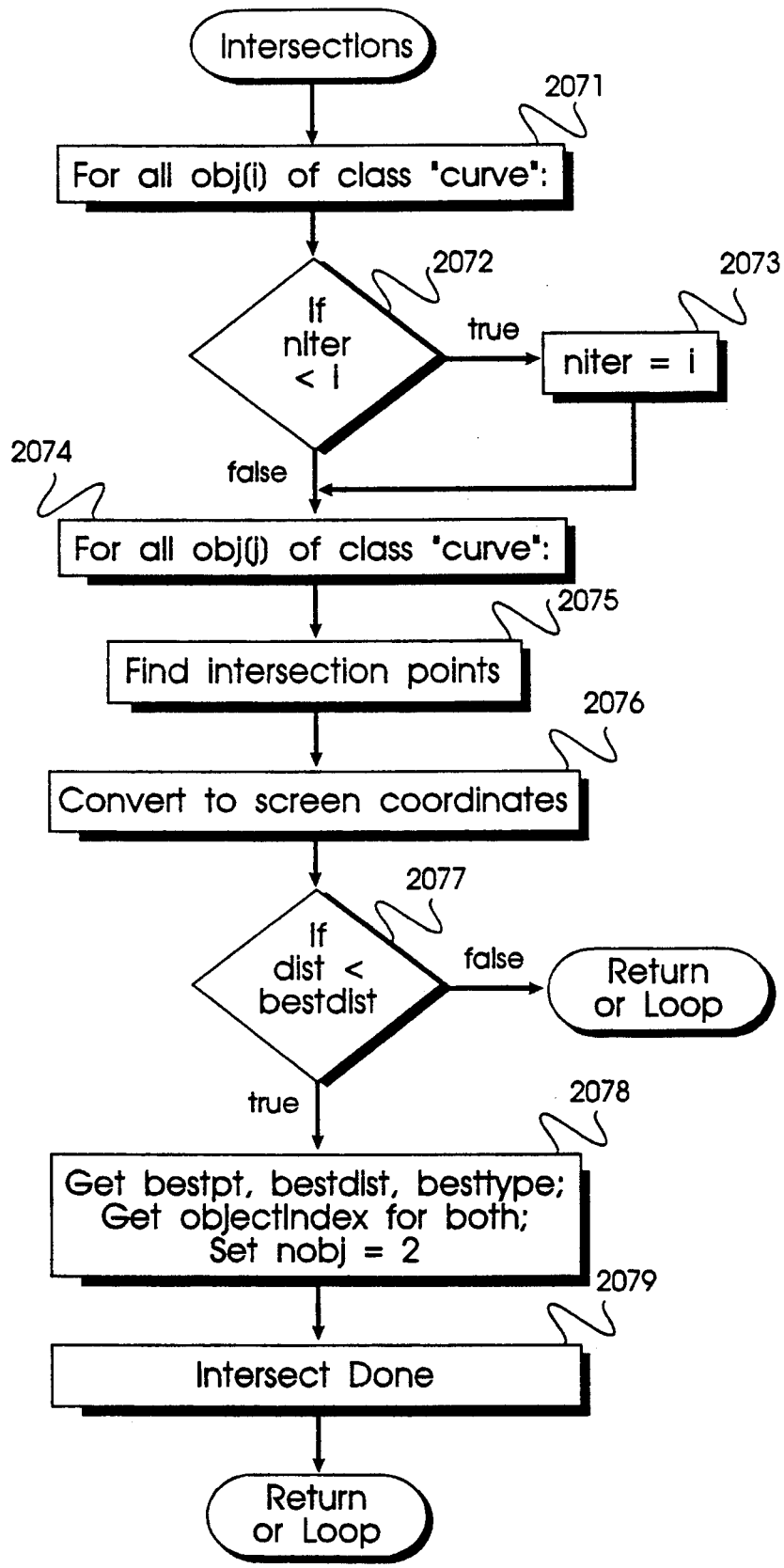
FIG. 20J is a flow diagram for the intersections case arm in the ptSnap function.

If at step 1711, ch is equal to 'i', then ptSnap determines intersections at step 1721. FIG. 20J illustrates the steps for determining intersections. To find intersections, the system tests one object against another; thus, two loops are required. To examine object pairs of class "curve," step 2071 sets up the outer loop, and step 2074 sets up the inner loop. The curve class comprises circles, arcs, splines, and lines (degenerate arcs). To avoid repetitious testing, step 2072 checks the number of iterations (niter) against the index number in the object array. If at step 2072, niter is less than the index, then at step 2073 it is set equal to the index, skipping already tested pairs.

Given two curves, step 2075 finds the intersection point, if any, and step 2076 converts this point to screen coordinates. If the distance from the probe to this point is not less than the bestdist at step 2077, the function loops to the next pair of curves or returns if none remain. Otherwise, at step 2078, the best record and the object indices for both curves are stored. The number of objects is set equal to 2. At step 2079, intersect done (INTERDONE) is called to appropriately dereference any objects used and test for any timeout errors. The function concludes by returning or looping, depending on the objects remaining.

Figure 20K:
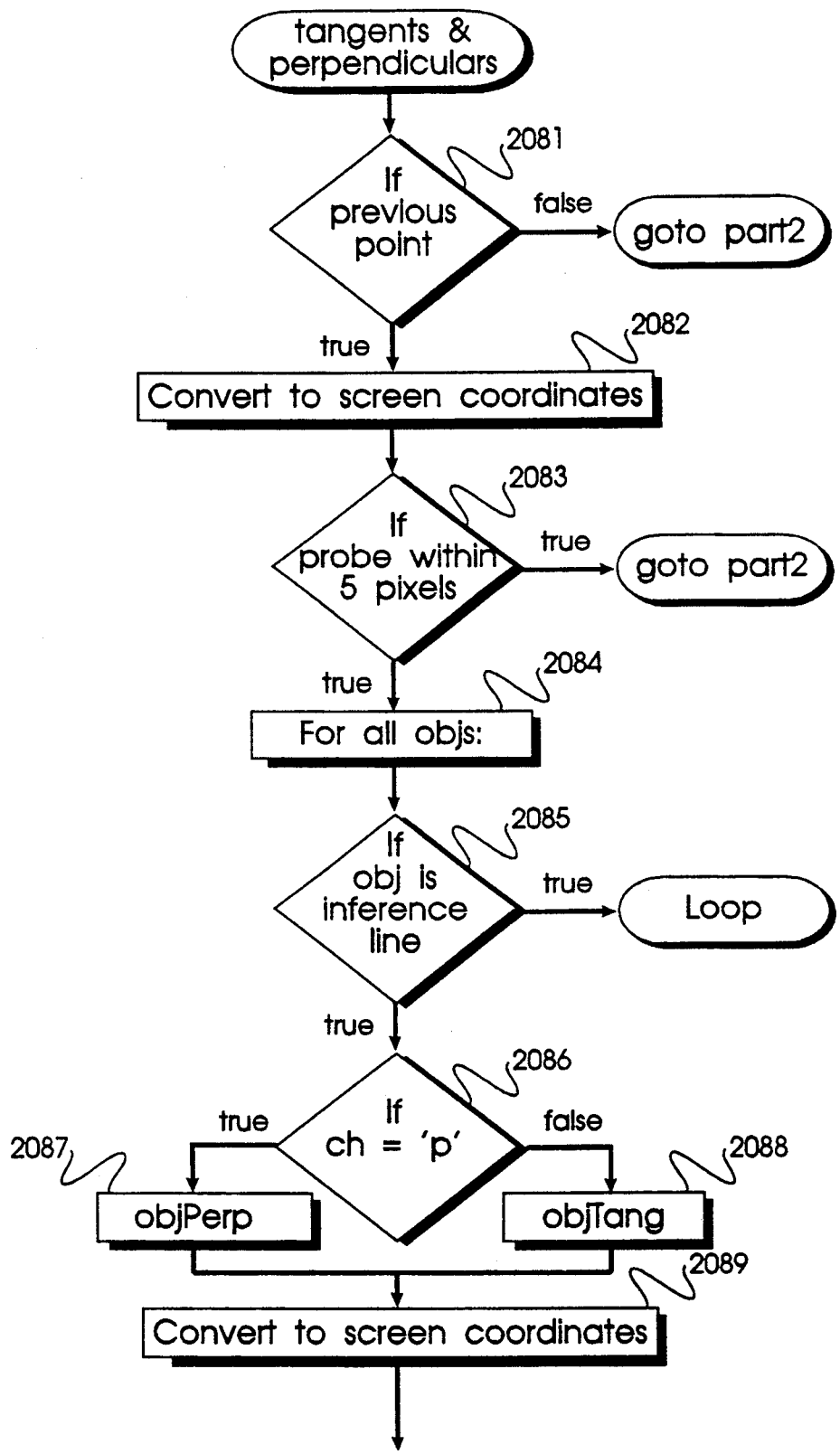
FIGS. 20K-L are flow diagrams for the tangents and perpendiculars case arm in the ptSnap function.
Figure 20L:
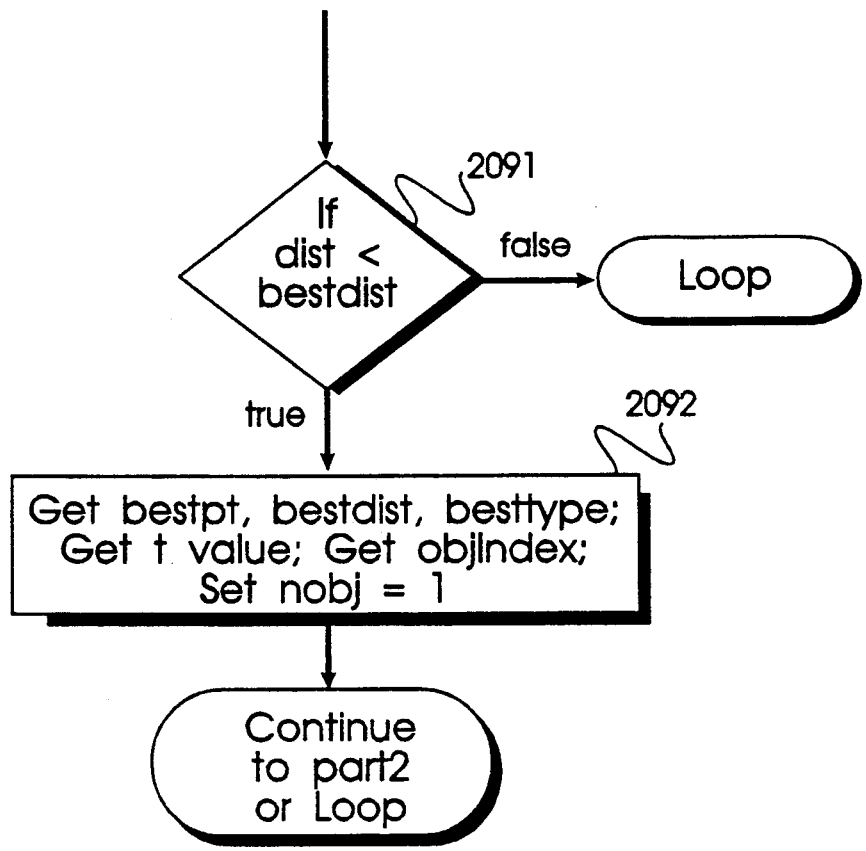

If ch is equal to 't' or 'p' in step 1711, then ptSnap determines the tangent at step 1722 or the perpendicular at step 1723, respectively. FIGS. 20K-L illustrate the determination of tangents and perpendiculars. It is apparent that there is much overlap between the two. The function checks if there is a previous point in step 2081; a previous point is required for the system to be tangent or perpendicular with. If a previous point is not found, the function goes to part2.

At step 2082, the previous point is converted to screen coordinates. At step 2083, the function checks whether the probe is within five pixels of the previous point. If this is true, then the probe is too close for determination of tangents and perpendiculars and the function goes to part2. Otherwise, at step 2084, a loop is set up for all objects. At step 2085, if the object is an inference line, then the function loops to the next object.

At step 2086, if ch is equal to 'p', i.e., perpendicular, then the function proceeds to step 2087 to calculate perpendiculars. The routine objPerp is called with an object, probe point, and previous point. It returns a parametric value, t, at the point that is perpendicular. If ch is not equal to 'p' in step 2086, the objTang routine is called (instead of objperp) to determine tangents. At step 2089, the point found is converted to screen coordinates. At step 2091, if the distance from the point to the probe point is not less than the best distance, then the function loops. Otherwise, at step 2092 the best record, the t value, and object index are stored; the number of objects is set equal to one; and the function continues on to cleanup or loops.

There are two types of tangents which must be distinguished: point tangent and line tangent. A line created which is tangent to a curve is an example of the former, while moving a line so that it is tangent to a curve is an example of the latter.

Figure 20M:
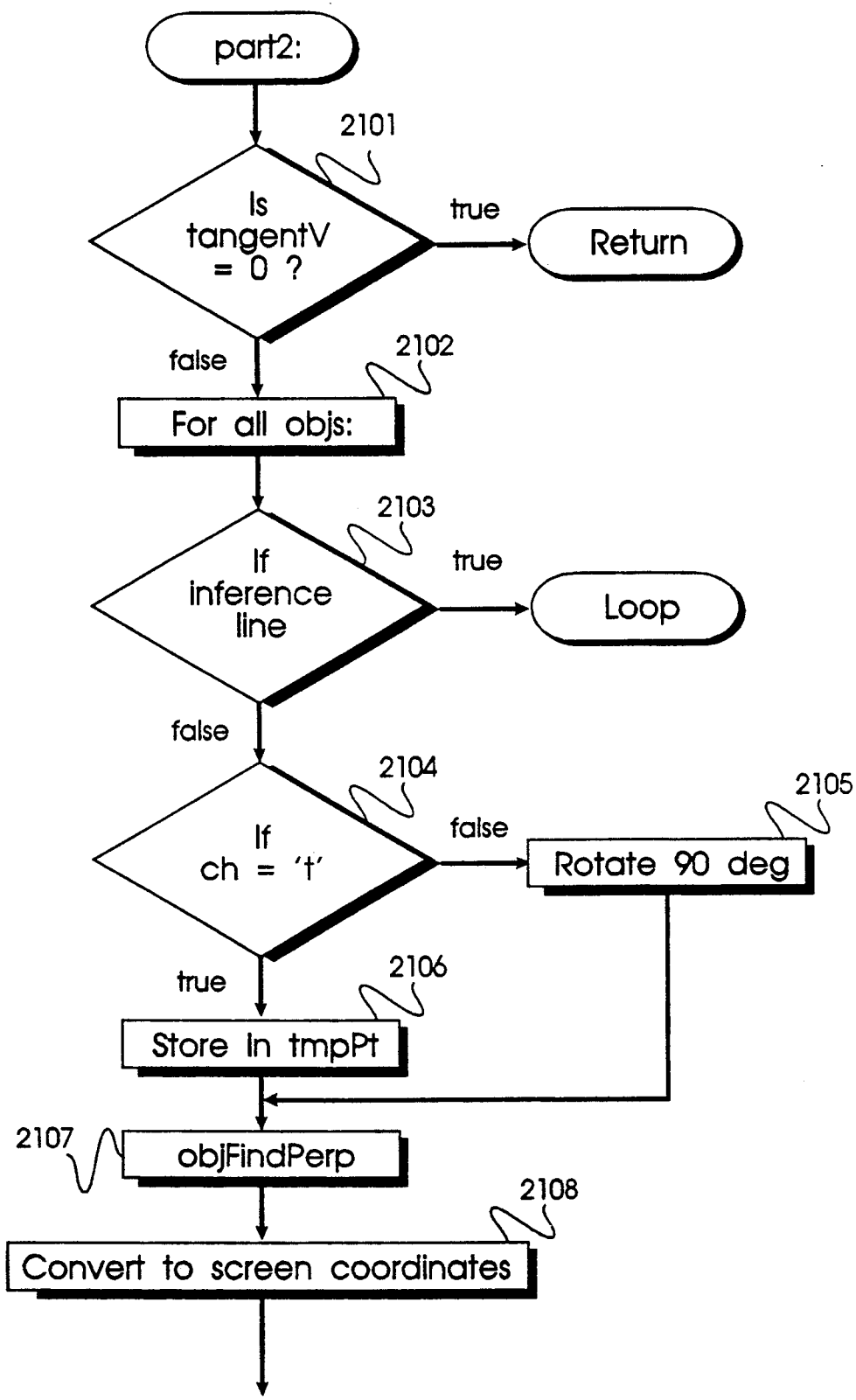
FIGS. 20M-N are flow diagrams for part2 in the tangents and perpendiculars case arm in the ptSnap function.
Figure 20N:
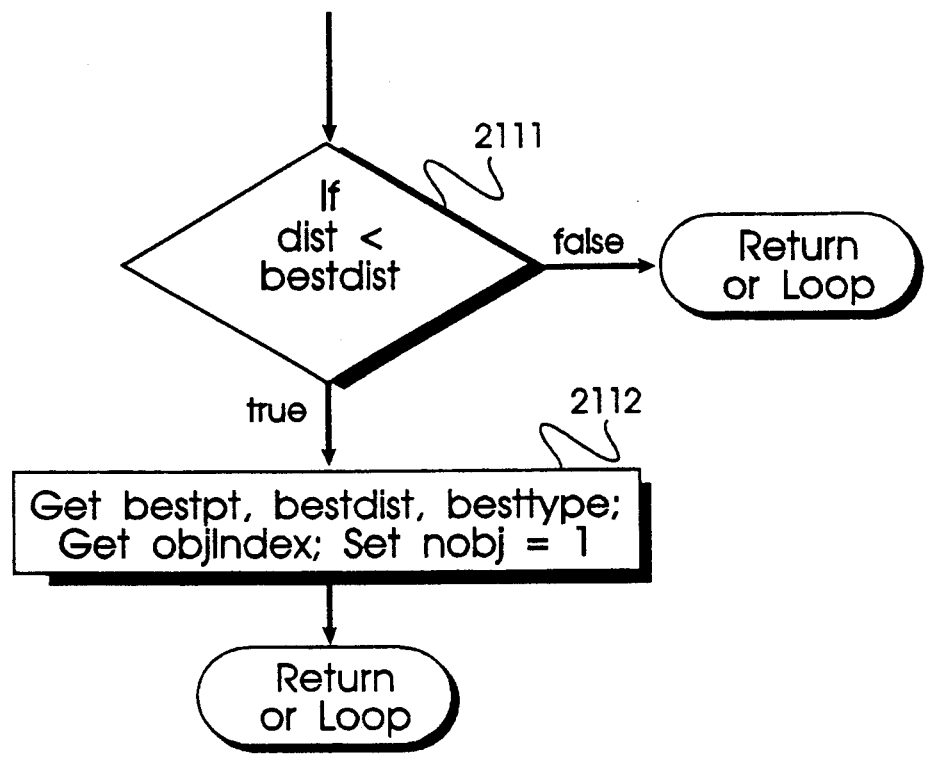
Figure 200:
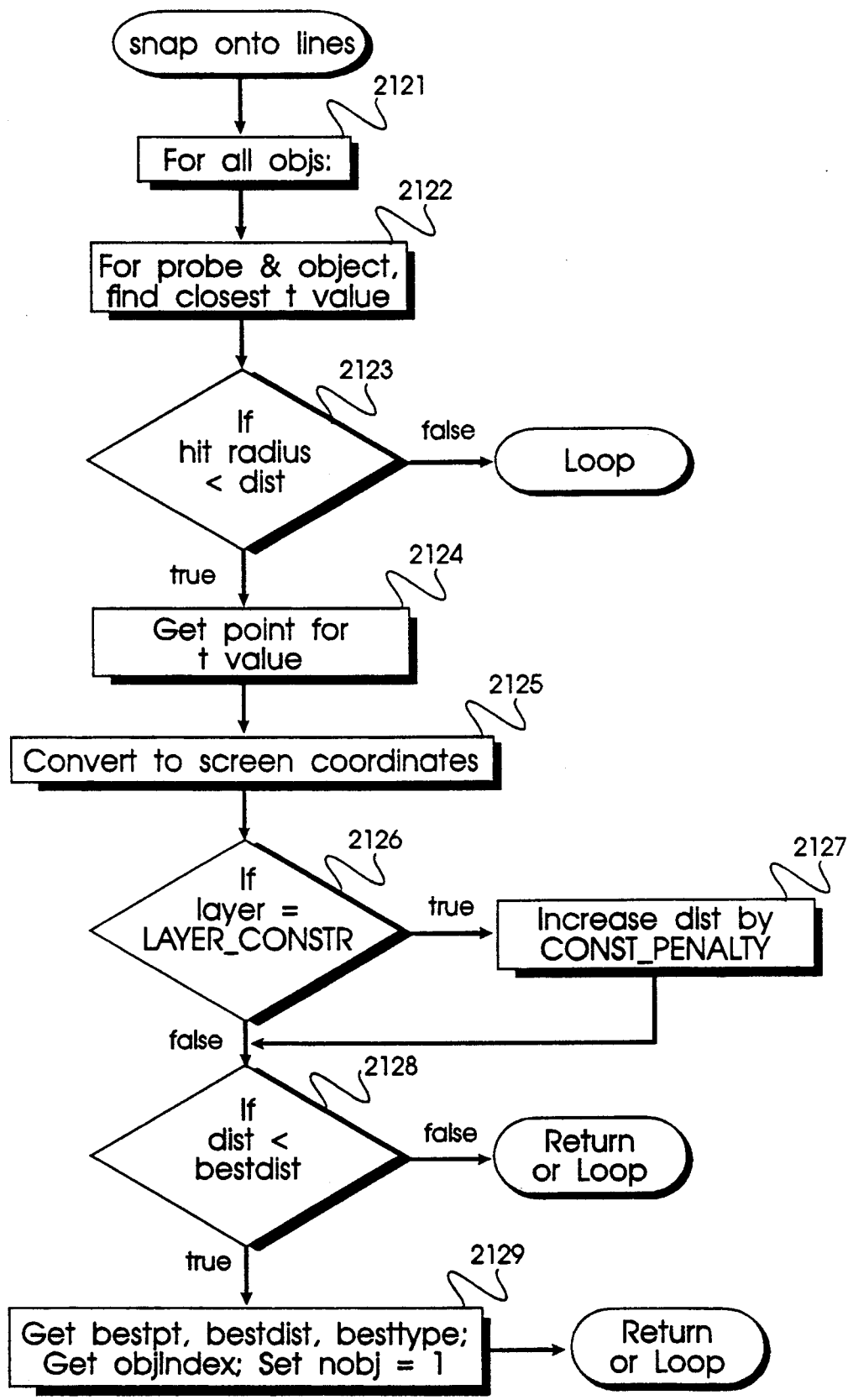

As FIGS. 20M-N illustrate, part2 checks for line tangents. At step 2101, the function inspects tangentV, located in the snaprecord, to determine if its magnitude is zero. If it is, then the function returns. At step 2102, a loop is set up for all objects. At step 2103, if the object is an inference line, the function loops to the next object. At step 2104, if ch is equal to 't', tangentV is stored in tempPt at step 2106. Otherwise, at step 2105 tangentV is crossed with normal, i.e., rotated 90°.

At step 2107, the routine objFindPerp is called to find another point which would create a line perpendicular to the curve. At step 2108, the point is converted to screen coordinates, and at step 2111, if the distance from the point to the probe is not less than the best distance, the function returns. Otherwise, at step 2112, the point, distance, and type are stored in the best record, the object index is stored, the number of objects is set to one, and the function returns.

If in step 1711, ch is equal to 'o', ptSnap tries to snap onto lines at step 1724. FIG. 20O illustrates this operation. At step 2121, a loop is established to test all objects. At step 2122, for a given object and a probe point, the function determines the t value on the object which is closest to the probe. If the distance is greater than the hit radius, then at step 2123, the function loops. Otherwise, at step 2124, a point is calculated from the t value, and at step 2125 it is converted to screen coordinates.

At step 2126, if the object is a construction object, then at step 2127 the distance is increased by a construction penalty. This step ensures that actual objects are preferred over construction objects. At step 2128, if the distance found is not less than the best distance, then the function returns or loops. Otherwise, at step 2129, the function completes the best record; gets the object index; sets the number of objects equal to one; and returns or loops to the next object.

Figure 20P:
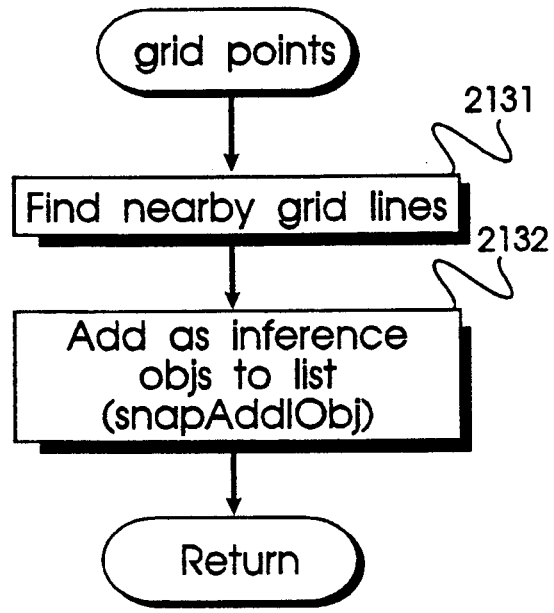
FIG. 20P is a flow diagram for the grid points case arm in the ptSnap function.

Until now, ptSnap has been concerned with snapping onto existing points. Starting with the case of ch equal 'g' in step 1711, ptSnap creates additional geometry and looks for new interesting points. FIG. 20P illustrates the operation for grid points. In step 2131, the function finds grid lines near the probe. At step 2132, snapAddIObj is called to add these grid lines as inference objects to the list before the function returns.

Figure 20Q:
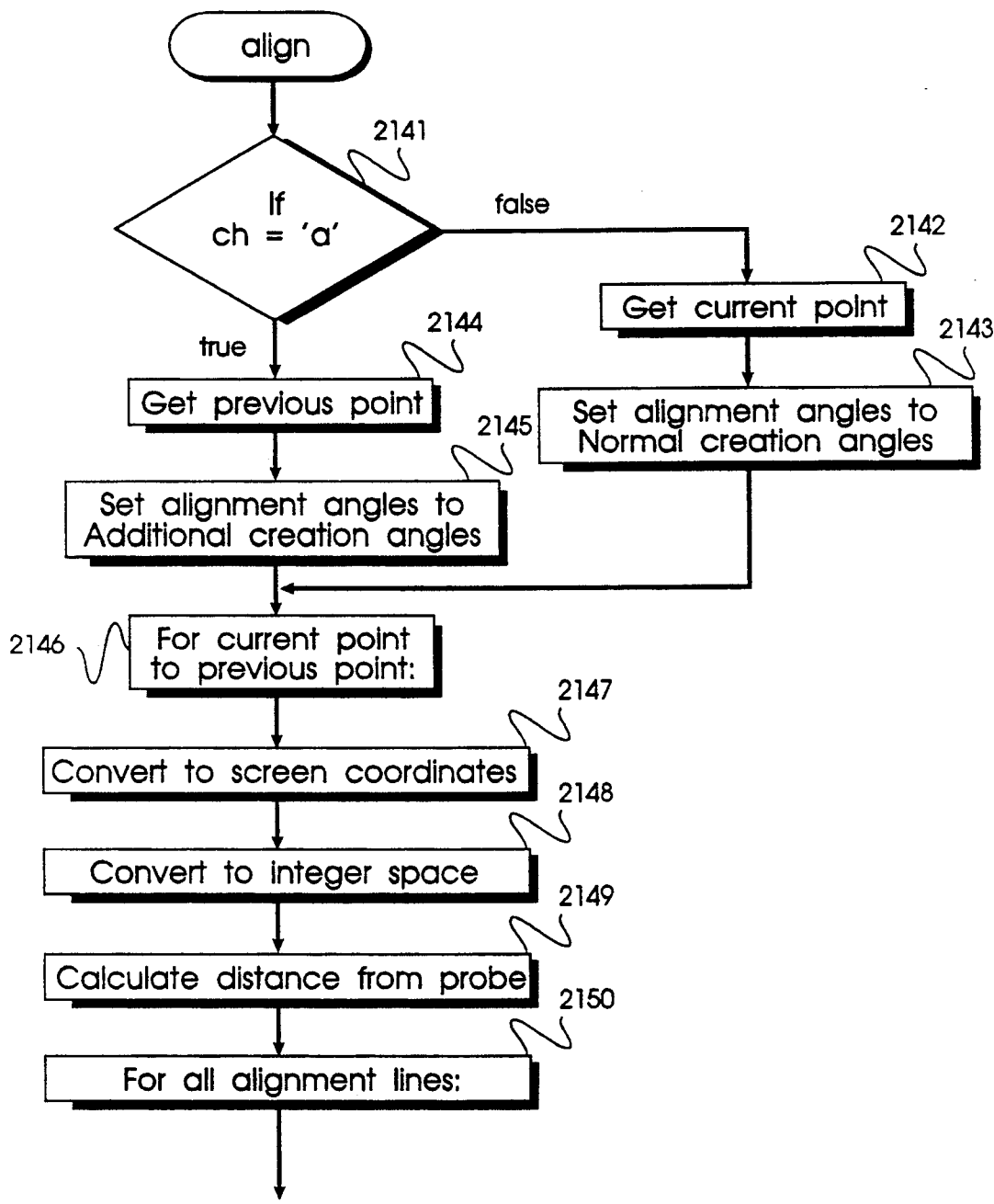
FIGS. 20Q-R are flow diagrams for the align case arm in the ptSnap function.
Figure 20R:
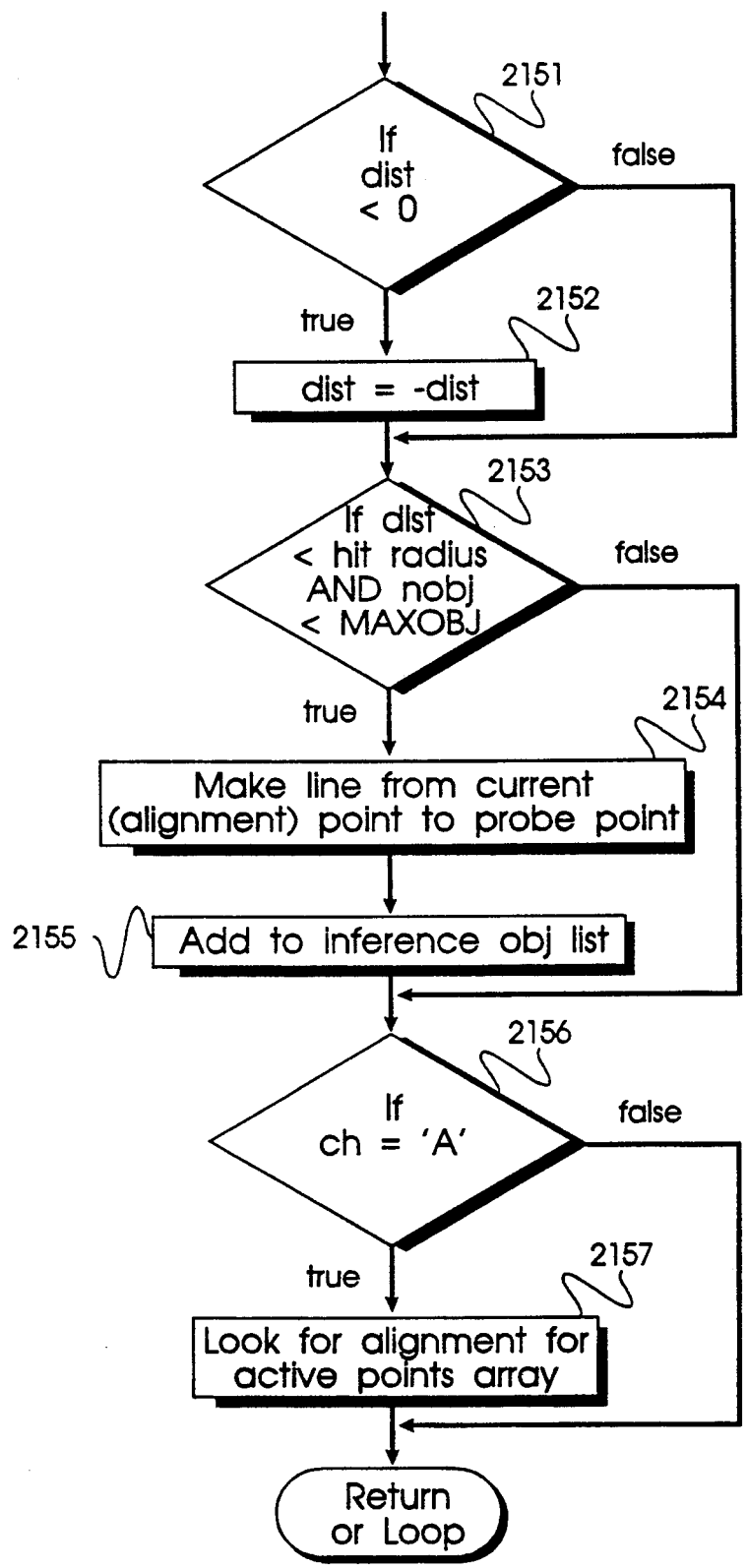

If ch is equal to 'A' or 'a' at step 1711, ptSnap attempts to align with all previous points at step 1727. FIG. 20Q illustrates this operation. At step 2141, the user desires normal creation angles. Thus, the function gets the current point (nprev−1) at step 2142 and sets the alignment angles equal to the normal creation angles in step 2143.

However, if ch is not equal to 'a' at step 2141, then additional creation angles are preferred. Thus, the function gets the previous point (nprev) at step 2144 and sets the alignment angles equal to additional creation angles at step 2145.

A loop is established at step 2146 to examine all previous points up to nprev. At step 2147, the point is converted to screen coordinates, and at step 2148 it is converted to integer space to increase performance. At step 2149, the distance from the point to the probe is calculated.

At step 2150, a second loop is established to examine all alignment lines. Steps 2151 and 2152 calculate the absolute value of the distance from the probe point to the alignment line. If in step 2153, this distance is within the hit radius and the number of objects has not exceeded the maximum number of objects, then the function constructs a line from the current alignment points to the past point (where the probe is at) in step 2154. This line is added to the inference object list in step 2155 by calling snapAddIObj.

At step 2156, if ch is equal to 'A', then the function determines alignment for the active points array. This array includes points, such as endpoints, quarter points, vertex points, midpoints, and intersections, which the user touches. Step 2157 repeats the alignment-line determination for this array. The function concludes by returning or looping if additional points remain to be checked.

Figure 20S:
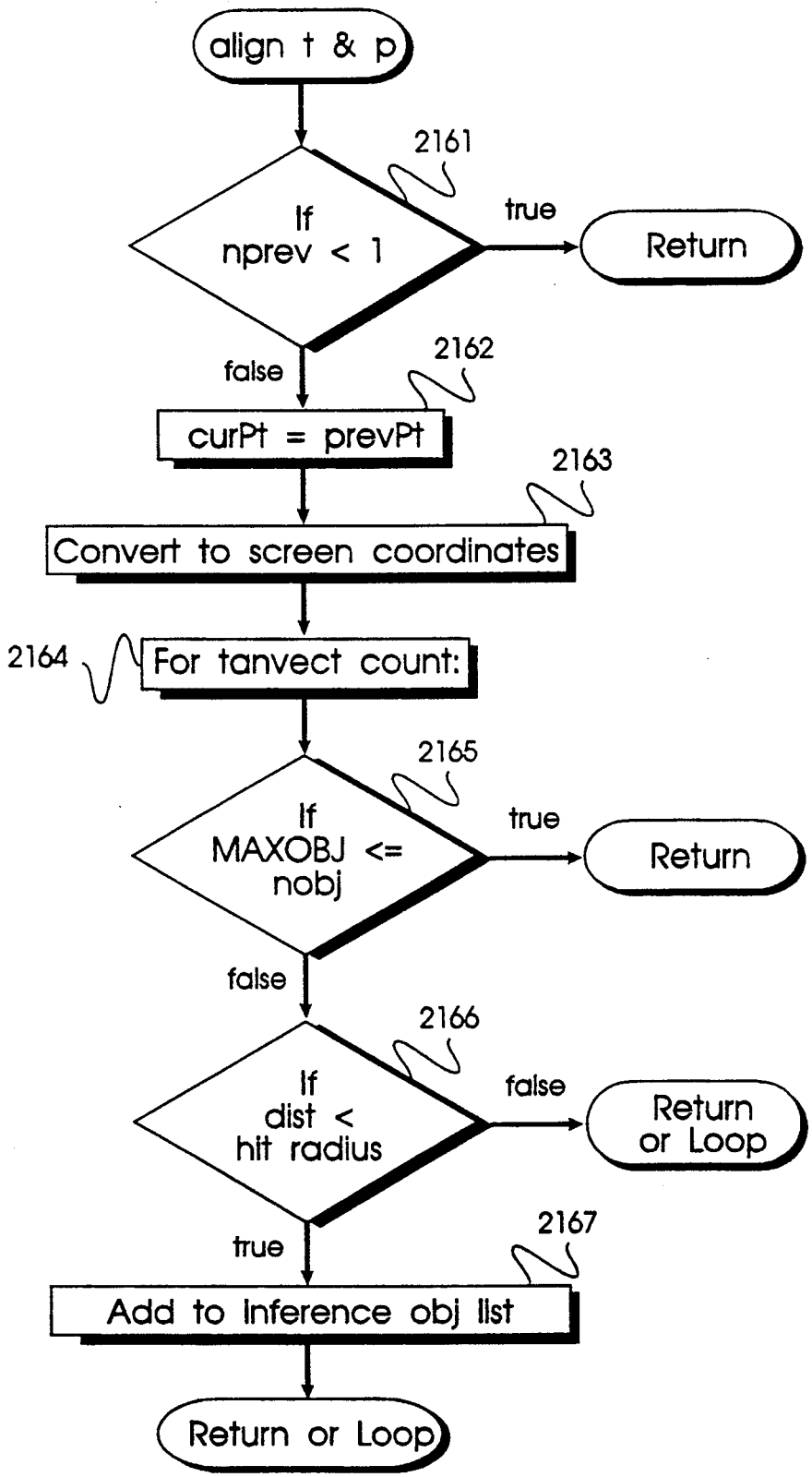
FIG. 20S is a flow diagram for the align t and p case arm in the ptSnap function.

If ch is equal to 'b' at step 1711, ptSnap attempts to align with tangents and perpendiculars at step 1728. FIG. 20S illustrates this operation. At step 2161, the function returns if there are no previous points since a single point cannot be a tangent or a perpendicular. At step 2162, the local variable current point (curPt) is set equal to the previous point. At step 2163, the current and the screen points are converted to screen coordinates. At step 2164, a loop is established to check each tangent vector (tanvect). Step 2165 checks to determine if the limit of the object array is exceeded. In step 2166, if the distance to the tangent or perpendicular is within the hit radius, then that object is added to the inference object list by snapAddIObj at step 2167. The function concludes by returning or looping.

Figure 20T:
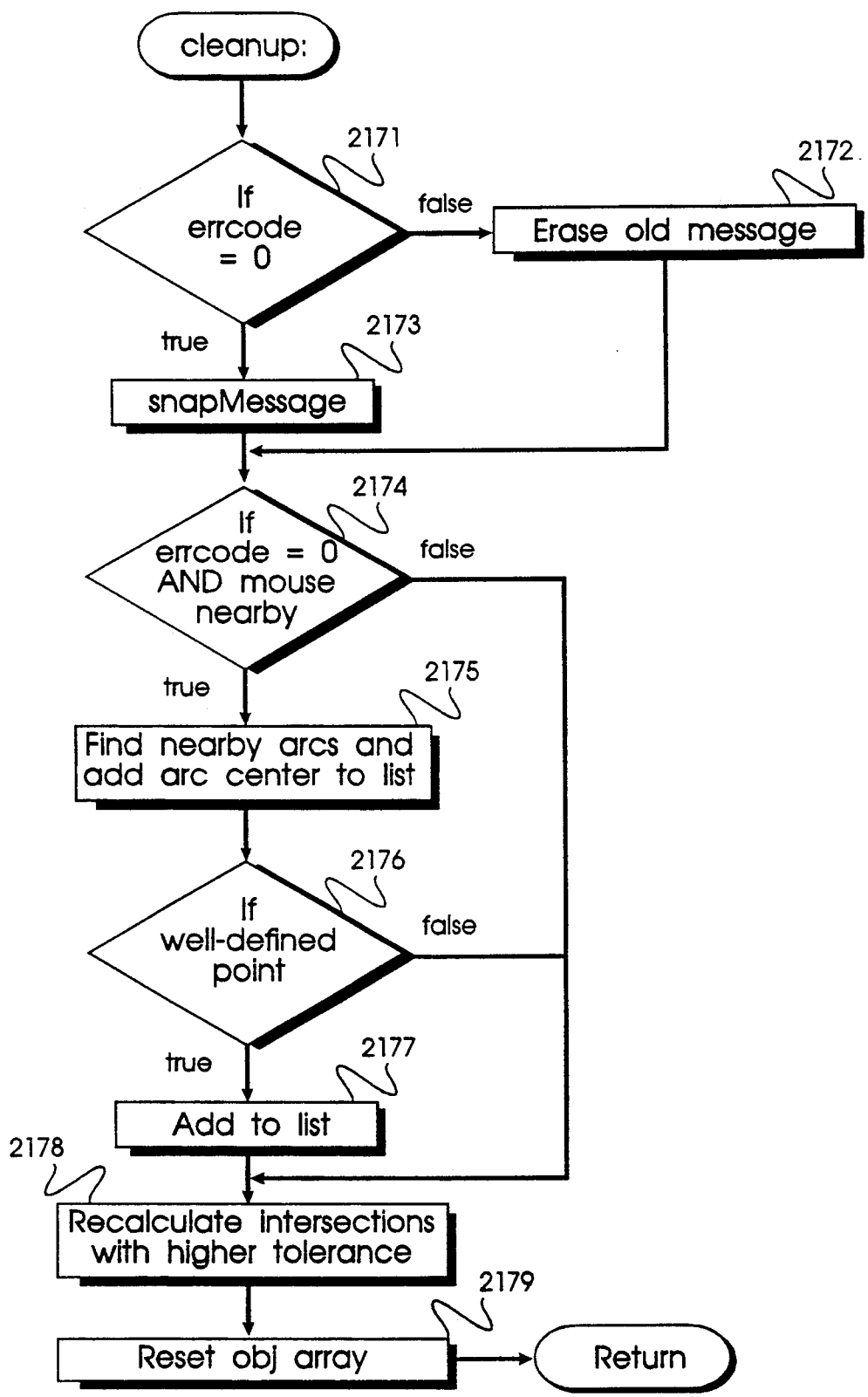
FIG. 20T is a flow diagram for the cleanup routine in the ptSnap function.

Once the case statement of step 1711 is finished, ptSnap goes to the cleanup routine. However, ptSnap may jump directly to cleanup from certain case arms, for example, null and freepoints. FIG. 20T illustrates the operation of cleanup. At step 2171, if there is no error, then snapMessage is called at step 2173. snapMessage looks up the appropriate screen message from a message table. By way of illustration and not limitation, one might construct a message table in C by the following declarations:

```
static char *msgTbl[ ] = {
    "f",
    "ggrid",
    "iintersect",
    "eendpoint",
    "mmidpoint",
    "oon",
    "ttangent",
    "pperpendicular",
    "ccenter",
    "qquadrant",
    "vvertex",
    "aalign",
    "%%point",
    0,
};
```

However, if there is an error at step 2171, such as a "timeout," the old message is erased at step 2172 without calling snapMessage.

Steps 2174 through 2177 add interesting points to the active points array. At step 2174, if there is no error and the mouse is nearby, than at step 2175 the function finds nearby arcs and adds their centers to the list. At steps 2176 and 2177, the function adds well-defined points to the list. At step 2178, any intersections found are recalculated at a higher tolerance. Finally, at step 2179, the object array is reset and the function returns.

While the invention is described in some detail with specific reference to a single preferred embodiment and certain alternatives, there is no intent to limit the invention to that particular embodiment or those specific alternatives. The true scope of the invention is defined not by the foregoing description but by the following claims.

What is claimed is:

1. A method for automatically locating geometric points for a user of a computer-aided drafting system, comprising the steps of:
   (a) defining a type of geometric point comprising at least one point type of interest to the user;
   (b) setting a hit radius;
   (c) displaying an object;
   (d) displaying a cursor to indicate a location;
   (e) testing the object to find a point of said at least one point type that is within the hit radius of the cursor;
   (f) if a point is found within the hit radius, then displaying the point; and
   (g) repeating steps (d)-(f) for a plurality of locations.

2. A method for automatically locating geometric points for a user of a computer-aided drafting system, comprising the steps of:
   (a) defining a set of geometric point types comprising at least one point type of interest to the user;
   (b) setting a hit radius;
   (c) displaying a frame containing at least one object;
   (d) displaying a cursor to indicate a location;
   (e) testing each of said at least one object to find a set of points that is within the hit radius of the cursor, each of said points being of said at least one point type;
   (f) determining a best point to be a point within said set which is closest to the cursor;
   (g) if the best point is determined in step (f), then displaying the best point; and
   (h) repeating steps (d)-(g) for a plurality of locations.

3. The method of claim 2, wherein step (f) comprises the steps of:
   if the set if found in step (e), then comparing a point in the set against a previously determined best point to determine which is closer to the cursor; and
   if the point in the set is closer to the cursor than the previously determined best point, then storing the point in the set as the best point.

4. The method of claim 2, wherein step (c) comprises displaying a frame containing at least one object actually created by the user, said object having actual geometry.

5. The method of claim 2, wherein step (c) comprises displaying a frame containing at least one object created temporarily by the system, said object having temporary geometry.

6. The method of claim 5, wherein said display step comprises the steps of:

defining an angle; and temporarily displaying a construction line at the defined angle.

7. The method of claim 6, wherein said angle defining step comprises the steps of:

defining a normal creation angle; and defining an additional creation angle.

8. The method of claim 5, wherein said displaying step comprises temporarily displaying a construction line tangent to said object.

9. The method of claim 8, further comprising the steps of:

moving said construction line; and maintaining the construction line tangent to said object during the moving step.

10. The method of claim 5, wherein said displaying step comprises temporarily displaying a construction line perpendicular to said object.

11. The method of claim 10, further comprising the steps of:

moving said construction line; and maintaining the construction line perpendicular to said object during the moving step.

12. The method of claim 5, wherein said displaying step comprises the steps of:

setting an offset distance; and temporarily displaying a construction line at the offset distance from said object.

13. The method of claim 5, wherein said displaying step comprises the steps of:

defining a vanishing point; and temporarily displaying a construction line which passes through the vanishing point.

14. The method of claim 5, wherein said displaying step comprises temporarily displaying a construction circle.

15. The method of claim 14, further comprising the step of constraining said construction circle to have a fixed radius.

16. The method of claim 2, wherein step (c) comprises displaying a frame containing at least one object actually created by the user and at least one object temporarily created by the system.

17. The method of claim 2, wherein step (a) comprises defining a set containing freepoints, grid points, intersections, endpoints, midpoints, points on objects, tangents, perpendiculars, centers, quadrant points, vertex points, align points, and percent points.

18. The method of claim 2, wherein step (e) comprises the steps of:

defining an ordered set containing at least one member representing said at least one interesting point type;

selecting each of said at least one member from said ordered set; and testing each of said at least one object to find a set of points, each of said points having a type of said at least one member and being within the hit radius of the cursor.

19. The method of claim 18, wherein said defining an ordered set step comprises defining a string containing at least one character representing said at least one interesting point type.

20. The method of claim 2, wherein said step (g) further comprises displaying a secondary cursor at said best point.

21. The method of claim 2, further comprising displaying a screen message indicating said at least one interesting point type.

22. The method of claim 21, wherein said screen message displaying step comprises displaying text.

23. The method of claim 22, wherein said text displaying step comprises displaying text selected from a set of messages, said set comprising the messages "grid", "intersect", "endpoint", "midpoint", "on", "tangent", "perpendicular", "center", "quadrant", "vertex", "align", and "% point."

24. The method of claim 21, wherein said screen message displaying step comprises displaying an icon.

25. A method for automatically locating geometric points for a user of a computer-aided drafting system, comprising the steps of:

(a) defining a set of geometric point types comprising at least one point type of interest to the user;

(b) defining a table to contain at least one textual message representing said at least one interesting point type;

(c) displaying an object;

(d) identifying a point on said object which is of said at least one point type;

(e) selecting one textual message representing said identified point; and (f) displaying said textual message.

26. A method for automatically locating geometric points for a user of a computer-aided drafting system, comprising the steps of:

(a) defining a set of geometric point types comprising at least one point type of interest to the user;

(b) setting a hit radius;

(c) displaying a frame containing at least one object;

(d) displaying a cursor to indicate a location;

(e) defining an ordered set containing at least one member representing said at least one point type;

(f) selecting one member from said ordered set;

(g) testing each of said at least one object to find a set of points, each point having the same type as the selected member and being within the hit radius of the cursor;

(h) if the set is found in step (g), then comparing a point int he set against a best point to determine which is closer to the cursor;

(i) if the point is closure to the cursor than the best point, then storing the point as the best point;

(j) if the best point is stored in step (i), then displaying the best point; and (k) repeating steps (d)–(j) for each said location.

27. A computer-aided drawing system comprising:

a computer having a memory and a processor;

a display device coupled to said computer;

a cursor-control device coupled to said computer for generating signals for moving a cursor on said display device; and programming means coupled to said processor comprising:

(a) means for storing in said memory a type of geometric point comprising at least one interesting point type;

(b) means for setting a hit radius for said cursor on said display device;

(c) means for displaying on said display device an object;

(d) means for displaying on said display device a cursor to indicate a location in response to said signals of said cursor-control device;

(e) means for testing the object to find a point of said at least one interesting point type that is within the hit radius of the cursor;

(f) if the point is found in (e), then means for displaying on said display device the point; and (g) means for repeating (d)–(f) for each said location in response to said signals of said cursor-control device.

28. A computer-aided drawing system comprising:

a computer having a memory and a processor;

a display device coupled to said computer;

a cursor-control device coupled to said computer for generating signals for moving a cursor on said display device; and programming means coupled to said processor comprising:

(a) means for storing in said memory a set of geometric point types comprising at least one point type of interest to the user;

(b) means for setting a hit radius for said cursor on said display device;

(c) means for displaying on said display device a frame containing at least one object;

(d) means for displaying on said display device a cursor to indicate a location in response to said signals of said cursor-control device;

(e) means for testing each of said at least one object to find a set of points that is within the hit radius of the cursor, each of said points being of said at least one point type;

(f) means for determining a best point to be a point within said set which is closest to the cursor on said display device;

(g) if the best point is determined in (f), then means for displaying on said display device the best point; and (h) means for repeating (d)–(g) for each said location in response to said signals of said cursor-control device.

29. A computer-aided drawings system comprising:

a computer having a memory and a processor;

a display device coupled to said computer;

a cursor-control device coupled to said computer for generating signals for moving a cursor on said display device;

and programming means coupled to said processor comprising:

(a) means for storing in said memory a set of geometric point types comprising at least one point type of interest to the user;

(b) means for storing in said memory a table containing at least one textual message representing said at least one point type;

(c) means for displaying on said display device an object;

(d) means for identifying on said displayed object a point which is of the one point type; and (e) means for displaying on said display device one textual message representing said identified point.

* * * * *